United States Patent
Fukasawa et al.

(10) Patent No.: US 10,959,312 B2
(45) Date of Patent: Mar. 23, 2021

(54) LIGHTING SYSTEM FOR LIGHTING SPACE WHERE DISPLAY ITEM IS DISPLAYED, AND LIGHTING METHOD

(71) Applicant: CITIZEN ELECTRONICS CO., LTD., Fujiyoshida (JP)

(72) Inventors: Koichi Fukasawa, Fujiyoshida (JP); Makoto Arai, Fujiyoshida (JP)

(73) Assignee: CITIZEN ELECTRONICS CO., LTD., Fujiyoshida (JP)

( * ) Notice: Subject to any disclaimer, the term of this patent is extended or adjusted under 35 U.S.C. 154(b) by 0 days.

(21) Appl. No.: 16/606,476

(22) PCT Filed: Apr. 20, 2018

(86) PCT No.: PCT/JP2018/016348
§ 371 (c)(1),
(2) Date: Oct. 18, 2019

(87) PCT Pub. No.: WO2018/194168
PCT Pub. Date: Oct. 25, 2018

(65) Prior Publication Data
US 2020/0396815 A1    Dec. 17, 2020

(30) Foreign Application Priority Data
Apr. 20, 2017    (JP) .............................. JP2017-083915

(51) Int. Cl.
*H05B 47/11*    (2020.01)
(52) U.S. Cl.
CPC .................................... *H05B 47/11* (2020.01)

(58) Field of Classification Search
None
See application file for complete search history.

(56) References Cited

U.S. PATENT DOCUMENTS

| | | | |
|---|---|---|---|
| 9,305,970 | B2 | 4/2016 | Horie |
| 9,373,757 | B2 | 6/2016 | Horie |

(Continued)

FOREIGN PATENT DOCUMENTS

| | | | |
|---|---|---|---|
| EP | 2 444 992 | | 4/2012 |
| JP | 5252107 | B2 | 7/2013 |
| JP | 5257538 | B2 | 8/2013 |

OTHER PUBLICATIONS

International Search Report dated Jul. 3, 2018, in PCT/JP2018/016348, 1 page.

(Continued)

*Primary Examiner* — Crystal L Hammond
(74) *Attorney, Agent, or Firm* — Oblon, McClelland, Maier & Neustadt, L.L.P.

(57) ABSTRACT

The present invention addresses an illumination system and an illumination method which make a space including a display item illuminated with VIVID lighting where $D_{uv}$ is greatly deviated negatively from zero not perceived as pale pinkish, and the issue is solved by an illumination system for illuminating a space where a display item is displayed, wherein the illumination system comprises a first light-emitting device mainly illuminating the display item and satisfying the predetermined conditions, and a second light-emitting device mainly illuminating a space other than the display item and satisfying the predetermined conditions.

16 Claims, 6 Drawing Sheets

(56) References Cited

U.S. PATENT DOCUMENTS

2010/0096998 A1    4/2010  Beers
2012/0112668 A1    5/2012  Van De Sluis et al.
2014/0183578 A1*   7/2014  Horie .................... H01L 27/156
                                                    257/89
2016/0308097 A1*  10/2016  Horie ................. C09K 11/7769

OTHER PUBLICATIONS

International Preliminary Report on Patentability and Written Opinion dated Oct. 31, 2019 in PCT/JP2018/016348 (English Translation only), 6 pages.
Davis, Wendy et al., Optical Engineering, Mar. 2010/vol. 49(3), pp. 033602-1-033602-16.
Extended European Search Report issued in corresponding European Application No. 18787462.3 dated Jan. 20, 2021.

* cited by examiner

LIGHTING SYSTEM FOR LIGHTING SPACE WHERE DISPLAY ITEM IS DISPLAYED, AND LIGHTING METHOD

TECHNICAL FIELD

The present invention relates to an illumination system and an illumination method of illuminating a space where a display item is displayed.

BACKGROUND ART

An illumination method and a light-emitting device that can implement a truly favorable color appearance of an object that is judged by statistically a large number of subjects to be more favorable compared to a case where illuminating is performed by reference light defined by the CIE, a case where illuminating is performed by a light-emitting device emitting light which produces a color appearance close to reference light and which has a high Ra and a high Ri, or the like even at an approximately similar correlated color temperature (CCT) and an approximately similar illuminance are being developed. Illuminating by such an illumination method or illuminating using such a light-emitting device may be referred to as VIVID lighting or the like. Such VIVID lighting is reported to be very widely used in applications, for example, as illuminating for display items such as clothing, food, cars, bags, shoes, accessories, or furniture (Patent Documents 1 and 2).

On the other hand, as described in Patent Documents 1 and 2, it is thought that white appears greenish when $D_{uv}$ which is the distance from a black-body radiation locus as defined by ANSI C78.377 is biased toward positive, white appears reddish (pinkish) when $D_{uv}$ takes a negative value, and overall color appearance becomes unnatural when $D_{uv}$ deviates from the vicinity of 0.

CITATION LIST

Patent Documents

Patent Document 1: Japan Patent 5257538
Patent Document 2: Japan Patent 5252107

SUMMARY OF INVENTION

Technical Problem

In cases in which a space including a display item is illuminated (the display item is mainly illuminated) with VIVID lighting where $D_{uv}$ is greatly deviated negatively from zero, for example,
(i) when the space is illuminated only with the VIVID lighting, or (ii) when the space illuminated with the VIVID lighting and a space illuminated with a conventionally used white LED lighting such as an incandescent lamp or a fluorescent lamp are adjacent (including cases where the light fields partially overlap), the space illuminated with the VIVID lighting may be perceived as pale pinkish. When moving from another space to the space illuminated by the VIVID lighting, the space illuminated by the VIVID lighting may be perceived as pale pinkish, which may be incongruous.

The present invention provides an illumination system and an illumination method which make a space including a display item illuminated with VIVID lighting where $D_{uv}$ is greatly deviated negatively from zero not perceived as pale pinkish.

Solution to Problem

The present inventors have found that the above problems can be solved by the following means. Specifically, for the above-described (i), in addition to VIVID lighting whose $D_{uv}$ is greatly deviated negatively from zero, VIVID lighting whose $D_{uv}$ is negative and is larger than the $D_{uv}$ of the VIVID lighting is used.

For the above-described (ii), in addition to VIVID lighting whose $D_{uv}$ is greatly deviated negatively from zero and a conventionally used white LED lighting such as an incandescent lamp or a fluorescent lamp, VIVID lighting whose $D_{uv}$ is negative and is larger than the $D_{uv}$ of the VIVID lighting is used.

The present invention is specifically as follows.
[1] An illumination system for illuminating a space where a display item is displayed, wherein
the illumination system comprises a first light-emitting device mainly illuminating the display item, and a second light-emitting device mainly illuminating a space other than the display item, wherein
(I) the first light-emitting device is a light-emitting device comprising a light-emitting element therein,
(I-1) light emitted from the light-emitting device comprises light whose $D_{uv}$ is from −0.0120 to −0.0050 in the main radiant direction;
(I-2) if an a* value and a b* value in CIE 1976 L*a*b* color space of 15 Munsell renotation color samples from #01 to #15 listed below when mathematically assuming illumination by the light emitted in the radiant direction are respectively denoted by $a^*_{nSSL}$ and $b^*_{nSSL}$ (where n is a natural number from 1 to 15), and
if an a* value and a b* value in CIE 1976 L*a*b* color space of the 15 Munsell renotation color samples when mathematically assuming illumination by a reference light that is selected according to a correlated color temperature $T_{SSL}(K)$ of the light emitted in the radiant direction are respectively denoted by $a^*_{nref}$ and $b^*_{nref}$ (where n is a natural number from 1 to 15), then,
in light emitted from the light-emitting device in the radiant direction,
each saturation difference $\Delta C_n$ (n is a natural number from 1 to 15) is from −3.8 to 18.6,
where $\Delta C_n$ (n is a natural number from 1 to 15)=$\sqrt{\{(a^*_{nSSL})^2+(b^*_{nSSL})^2\}}-\sqrt{\{(a^*_{nref})^2+(b^*_{nref})^2\}}$;
with the 15 Munsell renotation color samples being:

| #01 | 7.5P | 4/10 |
| #02 | 10PB | 4/10 |
| #03 | 5PB | 4/12 |
| #04 | 7.5B | 5/10 |
| #05 | 10BG | 6/8 |
| #06 | 2.5BG | 6/10 |
| #07 | 2.5G | 6/12 |
| #08 | 7.5GY | 7/10 |
| #09 | 2.5GY | 8/10 |
| #10 | 5Y | 8.5/12 |
| #11 | 10YR | 7/12 |
| #12 | 5YR | 7/12 |
| #13 | 10R | 6/12 |
| #14 | 5R | 4/14 |
| #15 | 7.5RP | 4/12 |

(I-3) the average of the $\Delta C_n$ (n is every integer from 1 to 15) is from 0.5 to 7.0;
(I-4) the saturation difference $\Delta C_{14}$ of the light-emitting device satisfies $$0 \leq \Delta C_{14},$$

where $\Delta C_{14}$ represents the $\Delta C_n$ when n=14;
(II) the second light-emitting device is a light-emitting device comprising a light-emitting element therein,
(II-1) light emitted from the light-emitting device comprises light whose $D_{uv}$ is from −0.0070 to less than 0 in the main radiant direction;
(II-2) in light emitted from the light-emitting device in the radiant direction, $\Delta C_n$ (n is a natural number from 1 to 15) defined in the same manner as in the case of the first light-emitting device is from −3.8 to 18.6;
(II-3) the average of the $\Delta C_n$ (n is every integer from 1 to 15) is from 0.5 to 7.0; and
(II-4) the saturation difference $\Delta C_{14}$ of the light-emitting device satisfies $$0 \leq \Delta C_{14},$$

where $\Delta C_{14}$ represents the $\Delta C_n$ when n=14; and (III) if the average of $\Delta C_n$ (n is every integer from 1 to 15) of the first light-emitting device is $SAT_{ave1}$, and
if the average of $\Delta C_n$ (n is every integer from 1 to 15) of the second light-emitting device is $SAT_{ave2}$, $$SAT_{ave2} < SAT_{ave1}$$

is satisfied;
[2] The illumination system according to [1], wherein
(IV) if $D_{uv}$ of the first light-emitting device is $D_{uvSSL1}$, and if $D_{uv}$ of the second light-emitting device is $D_{uvSSL2}$, $$D_{uvSSL1} < D_{uvSSL2}$$

is satisfied,
[3] The illumination system according to [1] or [2], wherein
(V) $|D_{uvSSL2} - D_{uvSSL1}|$ which is a difference between the $D_{uvSSL1}$ and the $D_{uvSSL2}$ is more than 0 to 0.0070.
[4] The illumination system according to any one of [1] to [3], wherein
in the first and second light-emitting devices, (I-5) (II-5) if a spectral power distribution of light emitted from the light-emitting device in the radiant direction is denoted by $\varphi_{SSL}(\lambda)$, a spectral power distribution of a reference light that is selected according to $T_{SSL}(K)$ of the light emitted from the light-emitting device in the radiant direction is denoted by $\varphi_{ref}(\lambda)$, tristimulus values of the light emitted from the light-emitting device in the radiant direction are denoted by $(X_{SSL}, Y_{SSL}, Z_{SSL})$, and tristimulus values of the reference light that is selected according to $T_{SSL}(K)$ of the light emitted from the light-emitting device in the radiant direction are denoted by $(X_{ref}, Y_{ref}, Z_{ref})$, and
if a normalized spectral power distribution $S_{SSL}(\lambda)$ of light emitted from the light-emitting device in the radiant direction, a normalized spectral power distribution $S_{ref}(\lambda)$ of a reference light that is selected according to $T_{SSL}(K)$ of the light emitted from the light-emitting device in the radiant direction, and a difference $\Delta S_{SSL}(\lambda)$ between these normalized spectral power distributions are respectively defined as $$S_{SSL}(\lambda) = \varphi_{SSL}(\lambda)/Y_{SSL},$$

$$S_{ref}(\lambda) = \varphi_{ref}(\lambda)/Y_{ref} \text{ and}$$

$$\Delta S_{SSL}(\lambda) = S_{ref}(\lambda) - S_{SSL}(\lambda) \text{ and}$$

in the case when a wavelength that produces a longest wavelength local maximum value of $S_{SSL}(\lambda)$ in a wavelength range from 380 nm to 780 nm is denoted by $\lambda_R$ (nm), and a wavelength $\lambda 4$ that assumes $S_{SSL}(\lambda_R)/2$ exists on a longer wavelength-side of $\lambda_R$,
an index $A_{cg}$ represented by the following Expression (1) is from −30 to 120, and
on the other hand, in the case when a wavelength that produces a longest wavelength local maximum value of the $S_{SSL}(\lambda)$ in a wavelength range from 380 nm to 780 nm is denoted by $\lambda_R$ (nm), and a wavelength $\lambda 4$ that assumes $S_{SSL}(\lambda_R)/2$ does not exist on a longer wavelength-side of $\lambda_R$,
an index $A_{cg}$ represented by the following Expression (2) is from −30 to 120;

[Expression 1]

$$A_{cg} = \int_{380}^{495} \Delta S(\lambda) d\lambda + \int_{495}^{590} (-\Delta S(\lambda)) d\lambda + \int_{590}^{\lambda 4} \Delta S(\lambda) d\lambda \quad (1)$$

[Expression 2]

$$A_{cg} = \int_{380}^{495} \Delta S(\lambda) d\lambda + \int_{495}^{590} (-\Delta S(\lambda)) d\lambda + \int_{590}^{780} \Delta S(\lambda) d\lambda, \quad (2)$$

and (VI) if the index $A_{cg}$ of the first light-emitting device is $A_{cg}(\varphi_{SSL1}(\lambda))$, and if the index $A_{cg}$ of the second light-emitting device is $A_{cg}(\varphi_{SSL2}(\lambda))$, $$A_{cg}(\varphi_{SSL1}(\lambda)) < A_{cg}(\varphi_{SSL2}(\lambda))$$

is satisfied.
[5] The illumination system according to any one of [2] to [4], wherein
(VII) $D_{uvSSL2}/D_{uvSSL1}$ which is the ratio of the $D_{uvSSL2}$ to the $D_{uvSSL2}$ is from 0.25 to 0.75.
[6] The illumination system according to any one of [1] to [5], further comprising a third light-emitting device, wherein
a space where the display item is displayed is a closed space provided with at least one entrance,
a space mainly illuminated by the third light-emitting device is one or more of the entrances, and
the third light-emitting device does not satisfy at least one of the conditions that the first light-emitting device satisfies, and does not satisfy at least one of the conditions that the second light-emitting device satisfies.
[7] An illumination method of illuminating a space where a display item is displayed, wherein
the illumination method comprises a first illuminating step mainly illuminating the display item with a first light-emitting device, and a second illuminating step mainly illuminating a space other than the display item with a second light-emitting device, wherein (I') light measured at the position of a display item when light emitted from the first light-emitting device mainly lights the display item in the first illuminating step lights in such a manner to satisfy the following conditions:
(I'-1) $D_{uv}$ is from −0.0120 to −0.0050;
(I'-2) if an a* value and a b* value in CIE 1976 L*a*b* color space of 15 Munsell renotation color samples from #01 to #15 listed below when mathematically assuming illumination by the light measured at the position of the display item are respectively denoted by $a^*_{nSSL}$ and $b^*_{nSSL}$ (where n is a natural number from 1 to 15), and
if an a* value and a b* value in CIE 1976 L*a*b* color space of the 15 Munsell renotation color samples when mathematically assuming illumination by a reference light that is selected according to a correlated color temperature $T_{SSL}(K)$ of the light measured at the position of the display item are respectively denoted by $a^*_{nref}$ and $b^*_{nref}$ (where n is a natural number from 1 to 15), then, each saturation difference $\Delta C_n$ (n is a natural number from 1 to 15) is from −3.8 to 18.6, where $\Delta C_n$ (n is a natural number from 1 to 15)$=\sqrt{\{(a^*_{nSSL})^2+(b^*_{nSSL})^2\}}-\sqrt{\{(a^*_{nref})^2+(b^*_{nref})^2\}}$;

with the 15 Munsell renotation color samples being:

| | | |
|---|---|---|
| #01 | 7.5P | 4/10 |
| #02 | 10PB | 4/10 |
| #03 | 5PB | 4/12 |
| #04 | 7.5B | 5/10 |
| #05 | 10BG | 6/8 |
| #06 | 2.5BG | 6/10 |
| #07 | 2.5G | 6/12 |
| #08 | 7.5GY | 7/10 |
| #09 | 2.5GY | 8/10 |
| #10 | 5Y | 8.5/12 |
| #11 | 10YR | 7/12 |
| #12 | 5YR | 7/12 |
| #13 | 10R | 6/12 |
| #14 | 5R | 4/14 |
| #15 | 7.5RP | 4/12 |

(I'-3) the average of the $\Delta C_n$ (n is every integer from 1 to 15) is from 0.5 to 7.0;

(I'-4) the saturation difference $\Delta C_{14}$ of the illuminating step satisfies $$0 \leq \Delta C_{14},$$

where $\Delta C_{14}$ represents the $\Delta C_n$ when n=14;

(II') light measured in a space other than the display item when light emitted from the second light-emitting device mainly lights the space other than the display item mainly illuminated by the first light-emitting device in the second illuminating step lights in such a manner to satisfy the following conditions:

(II'-1) $D_{uv}$ is from −0.0070 to less than 0;

(II'-2) in the light measured in a space other than the display item, the saturation difference $\Delta C_n$ (n is a natural number from 1 to 15) defined in the same manner as in the case of the first illuminating step is from −3.8 to 18.6;

(II'-3) the average of the $\Delta C_n$ (n is every integer from 1 to 15) is from 0.5 to 7.0; and (II'-4) the saturation difference $\Delta C_{14}$ of the illuminating step satisfies $$0 \leq \Delta C_{14},$$

where $\Delta C_{14}$ represents the $\Delta C_n$ when n=14; and (III') if the average of $\Delta C_n$ (n is every integer from 1 to 15) of the first illuminating step is $SAT_{ave1}$, and if the average of $\Delta C_n$ (n is every integer from 1 to 15) of the second illuminating step is $SAT_{ave2}$, $$SAT_{ave2} < SAT_{ave1}$$

is satisfied.

[8] The illumination method according to [7], wherein (IV') if $D_{uv}$ of the first illuminating step is $D_{uvSSL1}$, and if $D_{uv}$ of the second illuminating step is $D_{uvSSL2}$, $$D_{uvSSL1} < D_{uvSSL2}$$

is satisfied.

[9] The illumination method according to [7] or [8], wherein (V') $|D_{uvSSL2}-D_{uvSSL1}|$ which is a difference between the $D_{uvSSL1}$ and the $D_{uvSSL2}$ is more than 0 to 0.0070.

[10] The illumination method according to any one of [7] to [9], wherein (I'-5) (II'-5) in the light measured at the position of the display item in the first illuminating step, and the light measured in a space other than the display item mainly illuminated by the first light-emitting device in the second illuminating step, if a spectral power distribution is denoted by $\varphi_{SSL}(\lambda)$, a spectral power distribution of a reference light that is selected according to $T_{SSL}(K)$ is denoted by $\varphi_{ref}(\lambda)$, tristimulus values are denoted by $(X_{SSL}, Y_{SSL}, Z_{SSL})$, and tristimulus values of the reference light that is selected according to $T_{SSL}(K)$ are denoted by $(X_{ref}, Y_{ref}, Z_{ref})$, and if a normalized spectral power distribution $S_{SSL}(\lambda)$, a normalized spectral power distribution $S_{ref}(\lambda)$ of a reference light that is selected according to $T_{SSL}(K)$, and a difference $\Delta S_{SSL}(\lambda)$ between these normalized spectral power distributions are respectively defined as $$S_{SSL}(\lambda)=\varphi_{SSL}(\lambda)/Y_{SSL},$$

$$S_{ref}(\lambda)=\varphi_{ref}(\lambda)/Y_{ref} \text{ and}$$

$$\Delta S_{SSL}(\lambda)=S_{ref}(\lambda)-S_{SSL}(\lambda) \text{ and}$$

in the case when a wavelength that produces a longest wavelength local maximum value of $S_{SSL}(\lambda)$ in a wavelength range from 380 nm to 780 nm is denoted by $\lambda_R$ (nm), and a wavelength λ4 that assumes $S_{SSL}(\lambda_R)/2$ exists on a longer wavelength-side of the $\lambda_R$, an index $A_{cg}$ represented by the following Expression (1) is from −30 to 120, and on the other hand, in the case when a wavelength that produces a longest wavelength local maximum value of the $S_{SSL}(\lambda)$ in a wavelength range from 380 nm to 780 nm is denoted by $\lambda_R$ (nm), and a wavelength λ4 that assumes $S_{SSL}(\lambda_R)/2$ does not exist on a longer wavelength-side of $\lambda_R$, an index $A_{cg}$ represented by the following Expression (2) is from −30 to 120;

[Expression 3]
$$A_{cg} = \int_{380}^{495} \Delta S(\lambda)d\lambda + \int_{495}^{590}(-\Delta S(\lambda))d\lambda + \int_{590}^{\lambda 4} \Delta S(\lambda)d\lambda \quad (1)$$

[Expression 4]
$$A_{cg} = \int_{380}^{495} \Delta S(\lambda)d\lambda + \int_{495}^{590}(-\Delta S(\lambda))d\lambda + \int_{590}^{780} \Delta S(\lambda)d\lambda \quad (2)$$

(VI') if the index $A_{cg}$ of the first illuminating step is $A_{cg}(\varphi_{SSL1}(\lambda))$, and if the index $A_{cg}$ of the second illuminating step is $A_{cg}(\varphi_{SSL2}(\lambda))$, $$A_{cg}(\varphi_{SSL1}(\lambda)) < A_{cg}(\varphi_{SSL2}(\lambda))$$

is satisfied.

[11] The illumination method according to any one of [8] to [10], wherein (VII') $D_{uvSSL2}/D_{uvSSL1}$ which is the ratio of $D_{uvSSL2}$ to $D_{uvSSL1}$ is from 0.25 to 0.75.

[12] The illumination method according to any one of [7] to [11], wherein a space where the display item is displayed is a closed space provided with at least one entrance, the method further comprising a third illuminating step in which a third light-emitting device mainly illuminates one or more of the entrances, wherein the third light-emitting device does not satisfy at least one of the conditions that the first light-emitting device satisfies, and does not satisfy at least one of the conditions that the second light-emitting device satisfies.

[13] An illumination system for illuminating a space where a display item is displayed, wherein the illumination system comprises a first light-emitting device mainly illuminating the display item, a second light-emitting device mainly illuminating a space other than the display item, and a fourth light-emitting device mainly illuminating a space around the space where the display item is displayed, wherein (I) the first light-emitting device is a light-emitting device comprising a light-emitting element therein, (I-1) light emitted from the light-emitting device comprises light whose $D_{uv}$ is from −0.0120 to −0.0050 in the main radiant direction;

(I-2) if an a* value and a b* value in CIE 1976 L*a*b* color space of 15 Munsell renotation color samples from #01 to #15 listed below when mathematically assuming illumination by the light emitted in the radiant direction are respectively denoted by $a^*_{nSSL}$ and $b^*_{nSSL}$ (where n is a natural number from 1 to 15), and if an a* value and a b* value in CIE 1976 L*a*b* color space of the 15 Munsell renotation color samples when mathematically assuming illumination by a reference light that is selected according to a correlated color temperature $T_{SSL}(K)$ of the light emitted in the radiant direction are respectively denoted by $a^*_{nref}$ and $b^*_{nref}$ (where n is a natural number from 1 to 15), then, in light emitted from the light-emitting device in the radiant direction, each saturation difference $\Delta C_n$ (n is a natural number from 1 to 15) is from −3.8 to 18.6, where $\Delta C_n$ (n is a natural number from 1 to 15)= $\{(a^*_{nSSL})^2+(b^*_{nSSL})^2\}-\sqrt{\{(a^*_{nref})^2+(b^*_{nref})^2\}}$;

with the 15 Munsell renotation color samples being:

| #01 | 7.5P  | 4/10   |
| #02 | 10PB  | 4/10   |
| #03 | 5PB   | 4/12   |
| #04 | 7.5B  | 5/10   |
| #05 | 10BG  | 6/8    |
| #06 | 2.5BG | 6/10   |
| #07 | 2.5G  | 6/12   |
| #08 | 7.5GY | 7/10   |
| #09 | 2.5GY | 8/10   |
| #10 | 5Y    | 8.5/12 |
| #11 | 10YR  | 7/12   |
| #12 | 5YR   | 7/12   |
| #13 | 10R   | 6/12   |
| #14 | 5R    | 4/14   |
| #15 | 7.5RP | 4/12   |

(I-3) the average of the $\Delta C_n$ (n is every integer from 1 to 15) is from 0.5 to 7.0;

(II) the second light-emitting device is a light-emitting device comprising a light-emitting element therein, (II-1) light emitted from the light-emitting device comprises light whose $D_{uv}$ is from −0.0070 to less than 0 in the main radiant direction;

(II-2) in light emitted from the light-emitting device in the radiant direction, $\Delta C_n$ (n is a natural number from 1 to 15) defined in the same manner as in the case of the first light-emitting device is from −3.8 to 18.6; and (II-3) the average of the $\Delta C_n$ (n is every integer from 1 to 15) is from 0.5 to 7.0;

(III) if the average of $\Delta C_n$ (n is every integer from 1 to 15) of the first light-emitting device is $SAT_{ave1}$, and if the average of $\Delta C_n$ (n is every integer from 1 to 15) of the second light-emitting device is $SAT_{ave2}$, $$SAT_{ave2}<SAT_{ave1}$$

is satisfied; and the first light-emitting device, the second light-emitting device, and the fourth light-emitting device satisfy at least one of the following conditions (IX-1) to (IX-4).

(IX-1)

If $D_{uv}$ of the first light-emitting device is $D_{uvSSL1}$, if $D_{uv}$ of the second light-emitting device is $D_{uvSSL2}$, and if $D_{uv}$ of the fourth light-emitting device is $D_{uvSSL4}$, $$D_{uvSSL1}<D_{uvSSL2}<D_{uvSSL4}$$

is satisfied.

$$D_{uvSSL2}=D_{uvSSL1}+(D_{uvSSL4}-D_{uvSSL1})\times\{(½)\pm x\} \quad \text{(IX-2)}$$

is satisfied, where x is 0.35 or less.

(IX-3)

If the average of $\Delta C_n$ (n is every integer from 1 to 15) of the fourth light-emitting device defined in the same manner as in the case of the first light-emitting device is $SAT_{ave4}$, $$SAT_{ave4}<SAT_{ave2}<SAT_{ave1}$$

is satisfied.

(IX-4)

$$SAT_{ave2}=SAT_{ave1}+(SAT_{ave4}-SAT_{ave1})\times\{(½)\pm x\}$$

is satisfied, where x is 0.35 or less.

[14] The illumination system according to [13], wherein (I-4) the saturation difference $\Delta C_{14}$ of the first light-emitting device satisfies $$0\le\Delta C_{14},$$

where $\Delta C_{14}$ represents the $\Delta C_n$ when n=14.

[15] The illumination system according to [13] or [14], wherein (II-4) the saturation difference $\Delta C_{14}$ of the second light-emitting device satisfies $$0\le\Delta C_{14},$$

where $\Delta C_{14}$ represents the $\Delta C_n$ when n=14.

[16] The illumination system according to any one of [13] to [15], wherein the first light-emitting device, the second light-emitting device, and the fourth light-emitting device satisfy both the condition (IX-1) and the condition (IX-2).

[17] The illumination system according to any one of [13] to [15], wherein the first light-emitting device, the second light-emitting device, and the fourth light-emitting device satisfy both the condition (IX-3) and the condition (IX-4).

[18] The illumination system according to any one of [13] to [15], wherein the first light-emitting device, the second light-emitting device, and the fourth light-emitting device satisfy all of the condition (IX-1) to the condition (IX-4).

[19] The illumination system according to any one of [13] to [18], wherein the first light-emitting device, the second light-emitting device, and the fourth light-emitting device satisfy the following condition (IX-5).

(IX-5)

If the correlated color temperature of light emitted from the first light-emitting device in the radiant direction is $T_{SSL1}(K)$, if the correlated color temperature of light emitted from the second light-emitting device in the radiant direction is $T_{SSL2}(K)$, if the correlated color temperature of light emitted from the fourth light-emitting device in the radiant direction is $T_{SSL4}(K)$, if, comparing the $T_{SSL1}(K)$ with the $T_{SSL4}(K)$, the larger one is $T_{SSL-H}(K)$, and the smaller one is $T_{SSL-L}(K)$, and if one million times the reciprocal of the $T_{SSL-H}(K)$ is Mired-H(K$^{-1}$), if one million times the reciprocal of the $T_{SSL-L}(K)$ is Mired-L(K$^{-1}$), and if one million times the reciprocal of the $T_{SSL2}(K)$ is Mired-2(K$^{-1}$), Mired-2($K^{-1}$)=Mired-$L(K^{-1})$+(Mired-$H(K^{-1})$−Mired-$L(K^{-1})$)×{(½)±x}, where x is 0.35 or less.

[20] An illumination method of illuminating a space where a display item is displayed, wherein the illumination method comprises a first illuminating step mainly illuminating the display item with a first light-emitting device, a second illuminating step mainly illuminating a space other than the display item with a second light-emitting device, and a fourth illuminating step mainly illuminating a space around the space where the display item is displayed with a fourth light-emitting device wherein (I') light measured at the position of a display item when light emitted from the first light-emitting device mainly lights the display item in the first illuminating step lights in such a manner to satisfy the following conditions:

(I'-1) $D_{uv}$ is from −0.0120 to −0.0050;

(I'-2) if an a* value and a b* value in CIE 1976 L*a*b* color space of 15 Munsell renotation color samples from #01 to #15 listed below when mathematically assuming illumination by the light measured at the position of the display item are respectively denoted by $a^*_{nSSL}$ and $b^*_{nSSL}$ (where n is a natural number from 1 to 15), and if an a* value and a b* value in CIE 1976 L*a*b* color space of the 15 Munsell renotation color samples when mathematically assuming illumination by a reference light that is selected according to a correlated color temperature $T_{SSL}(K)$ of the light measured at the position of the display item are respectively denoted by $a^*_{nref}$ and $b^*_{nref}$ (where n is a natural number from 1 to 15), then, each saturation difference $\Delta C_n$ (n is a natural number from 1 to 15) is from −3.8 to 18.6, where $\Delta C_n$ (n is a natural number from 1 to 15)=$\sqrt{\{(a^*_{nSSL})^2+(b^*_{nSSL})^2\}}-\sqrt{\{(a^*_{nref})^2+(b^*_{nref})^2\}}$;

with the 15 Munsell renotation color samples being:

| #01 | 7.5P | 4/10 |
| #02 | 10PB | 4/10 |
| #03 | 5PB | 4/12 |
| #04 | 7.5B | 5/10 |
| #05 | 10BG | 6/8 |
| #06 | 2.5BG | 6/10 |
| #07 | 2.5G | 6/12 |
| #08 | 7.5GY | 7/10 |
| #09 | 2.5GY | 8/10 |
| #10 | 5Y | 8.5/12 |
| #11 | 10YR | 7/12 |
| #12 | 5YR | 7/12 |
| #13 | 10R | 6/12 |
| #14 | 5R | 4/14 |
| #15 | 7.5RP | 4/12 |

(I'-3) the average of the $\Delta C_n$ (n is every integer from 1 to 15) is from 0.5 to 7.0;

(II') light measured in a space other than the display item when light emitted from the second light-emitting device mainly lights the space other than the display item mainly illuminated by the first light-emitting device in the second illuminating step lights in such a manner to satisfy the following conditions:

(II'-1) $D_{uv}$ is from −0.0070 to less than 0;

(II'-2) in the light measured in a space other than the display item, the saturation difference $\Delta C_n$ (n is a natural number from 1 to 15) defined in the same manner as in the case of the first illuminating step is from −3.8 to 18.6; and (II'-3) the average of the $\Delta C_n$ (n is every integer from 1 to 15) is from 0.5 to 7.0;

(III') if the average of $\Delta C_n$ (n is every integer from 1 to 15) of the first illuminating step is $SAT_{ave1}$, and if the average of $\Delta C_n$ (n is every integer from 1 to 15) of the second illuminating step is $SAT_{ave2}$, $$SAT_{ave2}<SAT_{ave1}$$

is satisfied; and light measured at the position of a display item when light emitted from the first light-emitting device mainly lights the display item in the first illuminating step, light measured in a space other than the display item when light emitted from the second light-emitting device mainly lights the space other than the display item mainly illuminated by the first light-emitting device in the second illuminating step, and light measured in a space around the space where the display item is displayed when light emitted from the fourth light-emitting device mainly lights the space therearound in the fourth illuminating step satisfy at least one of the following conditions (IX'-1) to (IX'-4).

(IX'-1)

If $D_{uv}$ of the first illuminating step is $D_{uvSSL1}$, if Duv of the second illuminating step is $D_{uvSSL2}$, and if $D_{uv}$ of the fourth illuminating step is $D_{uvSSL4}$, $$D_{uvSSL1}<D_{uvSSL2}<D_{uvSSL4}$$

is satisfied.

$$D_{uvSSL2}=D_{uvSSL1}+(D_{uvSSL4}-D_{uvSSL1})\times\{(½)\pm x\} \quad (IX'-2)$$

is satisfied, where x is 0.35 or less.

(IX'-3)

If the average of $\Delta C_n$ (n is every integer from 1 to 15) of the fourth illuminating step which is defined in the same manner as in the case of the first illuminating step is $SAT_{ave4}$, $$SAT_{ave4}<SAT_{ave2}<SAT_{ave1}$$

is satisfied.

$$SAT_{ave2}=SAT_{ave1}+(SAT_{ave4}-SAT_{ave1})\times\{(½)\pm x\} \quad (IX'-4)$$

is satisfied, where x is 0.35 or less.

[21] The illumination method according to [20], wherein (I'-4) the saturation difference $\Delta C_{14}$ of the first illuminating step satisfies $$0\leq\Delta C_{14},$$

where $\Delta C_{14}$ represents the $\Delta C_n$ when n=14.

[22] The illumination method according to [20] or [21], wherein
(II'-4) the saturation difference $\Delta C_{14}$ of the second illuminating step satisfies $$0 \leq \Delta C_{14},$$

where $\Delta C_{14}$ represents the $\Delta C_n$ when n=14.

[23] The illumination method according to any one of [20] to [22], wherein light measured at the position of a display item when light emitted from the first light-emitting device mainly lights the display item in the first illuminating step, light measured in a space other than the display item when light emitted from the second light-emitting device mainly lights the space other than the display item mainly illuminated by the first light-emitting device in the second illuminating step, and light measured in a space around the space where the display item is displayed when light emitted from the fourth light-emitting device mainly lights the space therearound in the fourth illuminating step satisfy both the condition (IX'-1) and the condition (IX'-2).

[24] The illumination method according to any one of [20] to [22], wherein light measured at the position of a display item when light emitted from the first light-emitting device mainly lights the display item in the first illuminating step, light measured in a space other than the display item when light emitted from the second light-emitting device mainly lights the space other than the display item mainly illuminated by the first light-emitting device in the second illuminating step, and light measured in a space around the space where the display item is displayed when light emitted from the fourth light-emitting device mainly lights the space therearound in the fourth illuminating step satisfy both the condition (IX'-3) and the condition (IX'-4).

[25] The illumination method according to any one of [20] to [22], wherein light measured at the position of a display item when light emitted from the first light-emitting device mainly lights the display item in the first illuminating step, light measured in a space other than the display item when light emitted from the second light-emitting device mainly lights the space other than the display item mainly illuminated by the first light-emitting device in the second illuminating step, and light measured in a space around the space where the display item is displayed when light emitted from the fourth light-emitting device mainly lights the space therearound in the fourth illuminating step satisfy all the conditions (IX'-1) to (IX'-4).

[26] The illumination method according to any one of [20] to [25], wherein light measured at the position of a display item when light emitted from the first light-emitting device mainly lights the display item in the first illuminating step, light measured in a space other than the display item when light emitted from the second light-emitting device mainly lights the space other than the display item mainly illuminated by the first light-emitting device in the second illuminating step, and light measured in a space around the space where the display item is displayed when light emitted from the fourth light-emitting device mainly lights the space therearound in the fourth illuminating step satisfy the following condition (IX'-5).

(IX'-5)

If the correlated color temperature of light measured at the position of a display item when light emitted from the first light-emitting device mainly lights the display item in the first illuminating step is $T_{SSL1}(K)$, if the correlated color temperature of light measured in a space other than the display item when light emitted from the second light-emitting device mainly lights the space other than the display item mainly illuminated by the first light-emitting device in the second illuminating step is $T_{SSL2}(K)$, if the correlated color temperature of light measured in a space around the space where the display item is displayed when light emitted from the fourth light-emitting device mainly lights the space therearound in the fourth illuminating step is $T_{SSL4}(K)$, if, comparing the $T_{SSL1}(K)$ with the $T_{SSL4}(K)$, the larger one is $T_{SSL-H}(K)$, and the smaller one is $T_{SSL-L}(K)$, and if one million times the reciprocal of the $T_{SSL-H}(K)$ is Mired-H$(K^{-1})$, if one million times the reciprocal of the $T_{SSL-L}(K)$ is Mired-L$(K^{-1})$, and if one million times the reciprocal of the $T_{SSL2}(K)$ is Mired-2$(K^{-1})$, $$\text{Mired-2}(K^{-1}) = \text{Mired-}L(K^{-1}) + (\text{Mired-}H(K^{-1}) - \text{Mired-}L(K^{-1})) \times \{(\frac{1}{2}) \pm x\},$$

where x is 0.35 or less.

Advantageous Effects of Invention

According to the present invention an illumination system and an illumination method which make a space including a display item illuminated with VIVID lighting where $D_{uv}$ is greatly deviated negatively from zero not perceived as pale pinkish can be provided.

DESCRIPTION OF EMBODIMENTS

Figure 1:
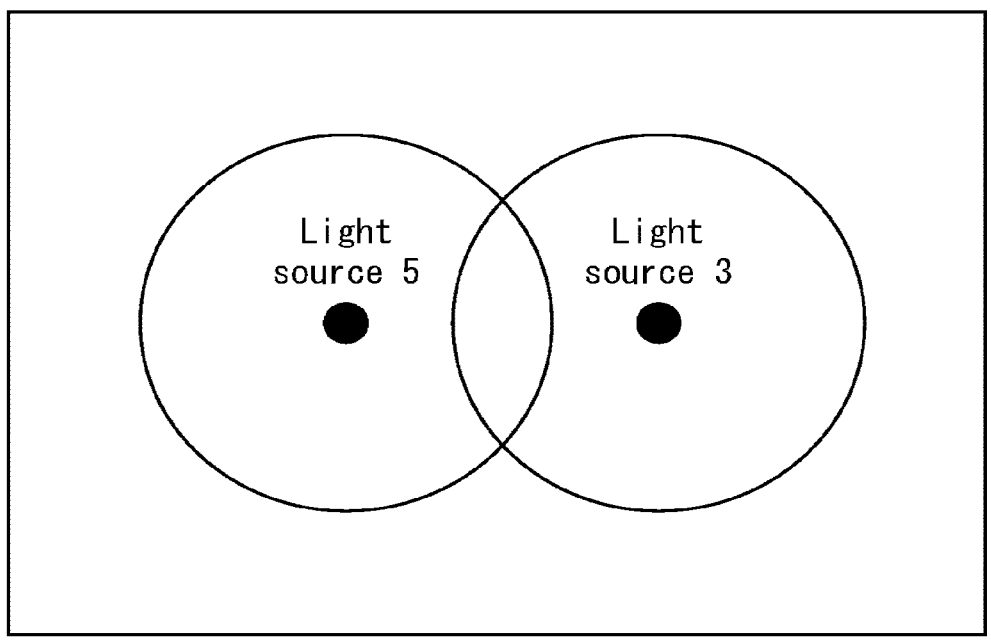
FIG. 1 is a view showing a light field of a light-emitting device in one embodiment of the present invention.

While the present invention will be described in detail hereinafter, it is to be understood that the present invention is not limited to the embodiments described below and that various modifications can be made without departing from the spirit and scope of the invention. The definition of the parameters described herein can be easily understood by those skilled in the art with reference to Patent Documents 1 and 2.

The present invention includes an illumination system (first embodiment) of illuminating a space where a display item is displayed, and an illumination method (second embodiment) of illuminating a space where a display item is displayed.

1. First Embodiment

The first embodiment of the present invention is an illumination system of illuminating a space where a display item is displayed, the illumination system including: a first light-emitting device satisfying a predetermined condition mainly illuminating a display item; and a second light-emitting device satisfying a predetermined condition mainly illuminating a space other than the display item.

Another aspect is an illumination system of illuminating a space where a display item is displayed, the illumination system including: a first light-emitting device satisfying a predetermined condition mainly illuminating a display item; a second light-emitting device satisfying a predetermined condition mainly illuminating a space other than the display item; and a fourth light-emitting device satisfying a predetermined condition mainly illuminating a space around a space where the display item is displayed.

The description of the predetermined conditions is understood with reference to the contents of Patent Document 1 and Patent Document 2.

The first light-emitting device included in the illumination system may be one type or two or more types, and may be one or two or more in number as long as a predetermined condition is satisfied. The same applies to second to fourth light-emitting devices included in the illumination system.

Hereinafter, although preferable conditions each of the first to fourth light-emitting devices satisfies are described, any light-emitting device may satisfy at least one of the predetermined conditions, and it is preferable to satisfy more conditions.

(Display Item)

The display item in the present embodiment is not particularly limited, and examples thereof include display items such as those in museums, goods to be displayed such as products, advertisements, or promotional materials, and attractions (such as events or shows) in amusement facilities.

(Space where Display Item is Displayed)

A space where a display item is displayed in the present embodiment may be an open space such as the outside of a building, or a closed space such as the inside of a building or an indoor area. In the case of a closed space, the closed space may or may not have an entrance, and preferably has at least one entrance. A hinged door, a door, a shutter, or the like may not be provided, and is preferably provided at such an entrance, and such an entrance may or may not be closed, and is preferably closed.

Since an effect of the present embodiment is favorably exhibited, the space is preferably a closed space.

The closed space is not particularly limited, and examples thereof include an exhibition space in an exhibition facility such as a gallery, a museum, or an aquarium where a display item is displayed, a product display space at a visitor waiting place in a company, a display space in a store where a product, an advertisement, a promotional material, or the like is displayed, and an attraction space in amusement facilities.

(First Light-Emitting Device)

The first light-emitting device included in the illumination system according to the present embodiment mainly illuminates a display item and satisfies a predetermined condition.

That the first light-emitting device "illuminates mainly a display item" means that the light field thereof includes the display item and that the device intensively illuminates the display item to be illuminated, the light field may include alight field of the second light-emitting device described below. The second light-emitting device, for example, corresponds to illuminating which is lit in a closed space even when the display item is not illuminated by the first light-emitting device. Specifically, in an enclosed space, a spotlight or the like which intensively illuminates a display item to be illuminated corresponds to the first light-emitting device, and a fluorescent lamp or the like which illuminates the whole closed space installed in a ceiling or the like corresponds to a second light-emitting device.

Similarly, the light field of the first light-emitting device may include the light field of the third light-emitting device and/or the light field of the fourth light-emitting device described below.

(I)

The first light-emitting device includes a light-emitting element therein.

(I-1)

Light emitted from the light-emitting device includes light whose $D_{uv}$ is from −0.0300 to −0.0050 in the main radiant direction.

$D_{uv}$ is preferably −0.0120 or more, more preferably −0.0110 or more, further preferably −0.0100 or more, and still more preferably −0.0095 or more. On the other hand, $D_{uv}$ is preferably −0.0052 or less, more preferably −0.0053 or less, and further preferably −0.0055 or less.

(I-2)

If an a* value and a b* value in CIE 1976 L*a*b* color space of 15 Munsell renotation color samples from #01 to #15 listed below when mathematically assuming illumination by the light emitted in the radiant direction from the light-emitting device are respectively denoted by $a^*_{nSSL}$ and $b^*_{nSSL}$ (where n is a natural number from 1 to 15), and if an a* value and a b* value in CIE 1976 L*a*b* color space of the 15 Munsell renotation color samples when mathematically assuming illumination by a reference light that is selected according to a correlated color temperature $T_{SSL}(K)$ of the light emitted in the radiant direction are respectively denoted by $a^*_{nref}$ and $b^*_{nref}$ (where n is a natural number from 1 to 15), then, in light emitted from the light-emitting device in the radiant direction, each saturation difference $\Delta C_n$ (n is a natural number from 1 to 15) is from −3.8 to 18.6, where $\Delta C_n$ (n is a natural number from 1 to 15)=√I{ $(a^*_{nSSL})2+(b^*_{nSSL})^2$}−{$(a^*_{nref})^2+(b^*_{nref})^2$}. Throughout the present specification, "√" indicates a radical symbol.

$\Delta C_n$ (n is a natural number from 1 to 15) is preferably −3.0 or more, more preferably −2.8 or more, and further preferably −2.5 or more. On the other hand, $\Delta C_n$ is preferably 17.0 or less, more preferably 16.0 or less, and still more preferably 15.0 or less.

(I-3)

The average of the $\Delta C_n$ (n is an integer from 1 to 15) is from 0.5 to 10.0.

The average of the $\Delta C_n$ (n is an integer from 1 to 15) is preferably 1.0 or more, more preferably 1.5 or more, and still more preferably 2.0 or more. On the other hand, the $\Delta C_n$ is preferably 7.0 or less, more preferably 6.8 or less, further preferably 6.5 or less, and still more preferably 5.0 or less.

(I-4)
The saturation difference $\Delta C_{14}$ of the light-emitting device satisfies $$0 \leq \Delta C_{14},$$

where $\Delta C_{14}$ represents $\Delta C_n$ when n=14.

The $\Delta C_{14}$ is preferably 0.3 or more, more preferably 0.5 or more, and still more preferably 1.0 or more. On the other hand, the $\Delta C_{14}$ is preferably 15.0 or less, more preferably 10.0 or less, and still more preferably 8.0 or less.

The light-emitting device preferably further satisfies the following conditions.

(I-5)
if a spectral power distribution of light emitted from the light-emitting device in the radiant direction is denoted by $\varphi_{SSL}(\lambda)$, a spectral power distribution of a reference light that is selected according to $T_{SSL}(K)$ of the light emitted from the light-emitting device in the radiant direction is denoted by $\varphi_{ref}(\lambda)$, tristimulus values of the light emitted from the light-emitting device in the radiant direction are denoted by $(X_{SSL}, Y_{SSL}, Z_{SSL})$, and tristimulus values of the reference light that is selected according to $T_{SSL}(K)$ of the light emitted from the light-emitting device in the radiant direction are denoted by $(X_{ref}, Y_{ref}, Z_{ref})$, and if a normalized spectral power distribution $S_{SSL}(\lambda)$ of light emitted from the light-emitting device in the radiant direction, a normalized spectral power distribution $S_{ref}(\lambda)$ of a reference light that is selected according to $T_{SSL}(K)$ of the light emitted from the light-emitting device in the radiant direction, and a difference $\Delta S_{SSL}(\lambda)$ between these normalized spectral power distributions are respectively defined as $$S_{SSL}(\lambda) = \varphi_{SSL}(\lambda)/Y_{SSL},$$

$$S_{ref}(\lambda) = \varphi_{ref}(\lambda)/Y_{ref} \text{ and}$$

$$\Delta S_{SSL}(\lambda) = S_{ref}(\lambda) - S_{SSL}(\lambda) \text{ and}$$

in the case when a wavelength that produces a longest wavelength local maximum value of $S_{SSL}(\lambda)$ in a wavelength range from 380 nm to 780 nm is denoted by $\lambda_R$(nm), and a wavelength $\lambda 4$ that assumes $S_{SSL}(\lambda_R)/2$ exists on a longer wavelength-side of $\lambda_R$, an index $A_{cg}$ represented by the following Expression (1) is from −30 to 120, and on the other hand, in the case when a wavelength that produces a longest wavelength local maximum value of the $S_{SSL}(\lambda)$ in a wavelength range from 380 nm to 780 nm is denoted by $\lambda_R$ (nm), and a wavelength $\lambda 4$ that assumes $S_{SSL}(\lambda_R)/2$ does not exist on a longer wavelength-side of $\lambda_R$, an index $A_{cg}$ represented by the following Expression (2) is from −30 to 120.

[Expression 5]

$$A_{cg} = \int_{380}^{495} \Delta S(\lambda) d\lambda + \int_{495}^{590} (-\Delta S(\lambda)) d\lambda + \int_{590}^{\lambda 4} \Delta S(\lambda) d\lambda \quad (1)$$

[Expression 6]

$$A_{cg} = \int_{380}^{495} \Delta S(\lambda) d\lambda + \int_{495}^{590} (-\Delta S(\lambda)) d\lambda + \int_{590}^{780} \Delta S(\lambda) d\lambda \quad (2)$$

The index $A_{cg}$ is preferably −28 or more, more preferably −27 or more, and still more preferably −25 or more. On the other hand, the index $A_{cg}$ is preferably 80 or less, more preferably 50 or less, and still more preferably 0 or less.

(Second Light-Emitting Device)

The second light-emitting device included in the illumination system according to the present embodiment mainly illuminates a space other than the above-described display item which is mainly illuminated by the first light-emitting device, and satisfies a predetermined condition.

That the second light-emitting device "illuminates mainly a space other than a display item" does not mean intensively illuminating a display item to be illuminated like the first light-emitting device, but means mainly illuminating a space where the display item is not present, and the light field of the first light-emitting device described above may be included in the light field of the second light-emitting device so as to illuminate an entire space where the display item is displayed. The second light-emitting device, for example, corresponds to illuminating which is lit in a closed space even when the display item is not illuminated by the first light-emitting device, and for example, the second light-emitting device illuminates the entire closed space. Specifically, in an enclosed space, a spotlight or the like which intensively illuminates a display item to be illuminated corresponds to the first light-emitting device, and a fluorescent lamp or the like which illuminates the whole closed space installed in a ceiling or the like corresponds to a second light-emitting device.

Similarly, the light field of the second light-emitting device may include the light field of the third light-emitting device and/or the light field of the fourth light-emitting device described below.

(II)

The second light-emitting device includes a light-emitting element therein.

(II-1)
Light emitted from the light-emitting device includes light whose $D_{uv}$ is from −0.0070 to less than 0 in the main radiant direction.

$D_{uv}$ is preferably −0.0069 or more, more preferably −0.0068 or more, and further preferably −0.0065 or more. On the other hand, $D_{uv}$ is preferably −0.0010 or less, more preferably −0.0015 or less, and further preferably −0.0025 or less.

(II-2)
In light emitted from the light-emitting device in the radiant direction, the saturation difference $\Delta C_n$ (n is a natural number from 1 to 15) defined in the same manner as in the case of the first light-emitting device is from −3.8 to 18.6.

$\Delta C_n$ (n is a natural number from 1 to 15) is preferably −3.0 or more, more preferably −2.8 or more, and further preferably −2.5 or more. On the other hand, $\Delta C_n$ is preferably 17.0 or less, more preferably 16.0 or less, and still more preferably 15.0 or less.

(II-3)
The average of the $\Delta C_n$ (n is an integer from 1 to 15) is from 0.5 to 10.0.

The average of the $\Delta C_n$ (n is an integer from 1 to 15) is preferably 0.55 or more, more preferably 0.6 or more, and still more preferably 0.7 or more. On the other hand, the $\Delta C_n$ is preferably 7.0 or less, more preferably 6.5 or less, further preferably 5.5 or less, and still more preferably 4.0 or less.

(II-4)
The saturation difference $\Delta C_{14}$ of the light-emitting device satisfies $$0 \leq \Delta C_{14},$$

where $\Delta C_{14}$ represents $\Delta C_n$ when n=14.

The saturation difference $\Delta C_{14}$ is preferably 0.3 or more, more preferably 0.5 or more, and still more preferably 1.0 or more. On the other hand, the $\Delta C_{14}$ is preferably 15.0 or less, more preferably 10.0 or less, and still more preferably 8.0 or less.

The light-emitting device preferably further satisfies the following conditions.

(II-5)

As defined in the same manner as in the condition (I-4), the index $A_{cg}$ represented by the above-described Expression (1) is from −30 to 120, and on the other hand, the index $A_{cg}$ represented by the above-described Expression (2) is from −30 to 120.

The index $A_{cg}$ is preferably −10 or more, more preferably −5 or more, and still more preferably 0 or more. On the other hand, the index $A_{cg}$ is preferably 118 or less, more preferably 116 or less, and still more preferably 115 or less.

(Relationship Between First Light-Emitting Device and Second Light-Emitting Device)

In the illumination system according to the present embodiment, the relationship between the first light-emitting device and the second light-emitting device further satisfies the following condition.

(III)

if the average of $\Delta C_n$ (n is every integer from 1 to 15) of the first light-emitting device is $SAT_{ave1}$, and if the average of $\Delta C_n$ (n is every integer from 1 to 15) of the second light-emitting device is $SAT_{ave2}$, $$SAT_{ave2} < SAT_{ave1}$$

is satisfied.

In the illumination system according to the present embodiment, preferably, the relationship between the first light-emitting device and the second light-emitting device further satisfies the following conditions.

(IV)

if $D_{uv}$ of the first light-emitting device is $D_{uvSSL1}$, and if $D_{uv}$ of the second light-emitting device is $D_{uvSSL2}$, $$D_{uvSSL1} < D_{uvSSL2}$$

is satisfied.

(V)

$|D_{uvSSL2} - D_{uvSSL1}|$ which is a difference between the $D_{uvSSL2}$ and the $D_{uvSSL2}$ is more than 0 to 0.0070.

The difference $|D_{uvSSL2} - D_{uvSSL1}|$ is preferably 0.0010 or more, more preferably 0.0012 or more, and still more preferably 0.0015 or more. On the other hand, the difference is preferably 0.0065 or less, more preferably 0.0060 or less, and still more preferably 0.0040 or less.

(VI)

if the index $A_{cg}$ of the first light-emitting device is $A_{cg}(\varphi_{SSL2}(\lambda))$, and if the index $A_{cg}$ of the second light-emitting device is $A_{cg}(\sim_{SSL2}(\lambda))$, $$A_{cg}(\varphi_{SSL1}(\lambda)) < A_{cg}(\varphi_{SSL2}(\lambda))$$

is satisfied.

(VII)

$D_{uvSSL2}/D_{uvSSL2}$ which is the ratio of $D_{uvSSL2}$ to $D_{uvSSL1}$ is from 0.25 to 0.75.

The ratio $D_{uvSSL2}/D_{uvSSL1}$ is preferably 0.30 or more, more preferably 0.35 or more, and still more preferably 0.40 or more. On the other hand, the ratio is preferably 0.70 or less, more preferably 0.65 or less, and still more preferably 0.60 or less.

(Third Light-Emitting Device)

The illumination system according to the present embodiment preferably further includes a third light-emitting device.

The third light-emitting device mainly illuminates a space which is neither a display item mainly illuminated by the first light-emitting device nor a space mainly illuminated by the second light-emitting device, wherein a space where the display item is displayed is a closed space provided with at least one entrance, and one or more entrances of the entrances.

The illumination system according to the present embodiment includes the first light-emitting device and the second light-emitting device, and in addition, may include the third light-emitting device and may not include the fourth light-emitting device described below, may not include the third light-emitting device and may include the fourth light-emitting device described below, or may include the third light-emitting device and may further include the fourth light-emitting device described below.

The light field of the third light-emitting device may include any of the light field of the first light-emitting device, the light field of the second light-emitting device, and the light field of the fourth light-emitting device described below.

The third light-emitting device is a light-emitting device that does not satisfy at least one of the conditions that the first light-emitting device satisfies, and does not satisfy at least one of the conditions that the second light-emitting device satisfies. Examples of the light-emitting device include an LED light-emitting device, an incandescent lamp, a fluorescent lamp, a xenon lamp, a mercury lamp, and an organic EL.

(Relationship Between First Light-Emitting Device, Second Light-Emitting Device, and Third Light-Emitting Device)

When the illumination system according to the present embodiment includes the first light-emitting device and the second light-emitting device, and does not include the fourth light-emitting device described below but includes the third light-emitting device, the relationship between the first light-emitting device, the second light-emitting device, and the third light-emitting device preferably satisfies at least one of the following conditions (VIII-1) to (VIII-4). As a result, respective lights emitted from the three light-emitting devices produce gradation without a sense of incongruity as a whole.

An aspect satisfying both the following condition (VIII-1) and the following condition (VIII-2) is preferable, and an aspect satisfying both the following condition (VIII-3) and the following condition (VIII-4) is also preferable.

It is preferable to satisfy all of the following conditions (VIII-1) to (VIII-4).

(VIII-1)

If Duv of the first light-emitting device is $D_{uvSSL1}$, if $D_{uv}$ of the second light-emitting device is $D_{uvSSL2}$, and if $D_{uv}$ of the third light-emitting device is $D_{uvSSL3}$, then $$D_{uvSSL1} < D_{uvSSL2} < D_{uvSSL3}$$

is satisfied.

$$D_{uvSSL2} = D_{uvSSL1} + (D_{uvSSL3} - D_{uvSSL1}) \times \{(\tfrac{1}{2}) \pm x\} \quad \text{(VIII-2)}$$

is satisfied, where x is preferably 0.35 or less, more preferably 0.30 or less, and still more preferably 0.25 or less.

(VIII-3)

If the average of $\Delta C_n$ (n is every integer from 1 to 15) of the first light-emitting device is $SAT_{ave1}$, if the average of $\Delta C_n$ (n is every integer from 1 to 15) of the second light-emitting device is $SAT_{ave2}$, and if the average of $\Delta C_n$ (n is every integer from 1 to 15) of the third light-emitting device defined in the same manner as in the case of the first light-emitting device is $SAT_{ave3}$, $$SAT_{ave3} < SAT_{ave2} < SAT_{ave1}$$

is satisfied.

$$SAT_{ave2} = SAT_{ave1} + (SAT_{ave3} - SAT_{ave1}) \times \{(\tfrac{1}{2}) \pm x\} \quad \text{(VIII-4)}$$

is satisfied, where x is preferably 0.35 or less, more preferably 0.30 or less, and still more preferably 0.25 or less.

In the illumination system according to the present embodiment, the first light-emitting device, the second light-emitting device, and the third light-emitting device preferably satisfy the following condition (VIII-5).

(VIII-5)

If the correlated color temperature of light emitted from the first light-emitting device in the radiant direction is $T_{SSL1}(K)$, if the correlated color temperature of light emitted from the second light-emitting device in the radiant direction is $T_{SSL2}(K)$, if the correlated color temperature of light emitted from the third light-emitting device in the radiant direction is $T_{SSL3}(K)$, if, comparing the $T_{SSL1}(K)$ with the $T_{SSL3}(K)$, the larger one is $T_{SSL-H}(K)$, and the smaller one is $T_{SSL-L}(K)$, and if one million times the reciprocal of the $T_{SSL-H}(K)$ is Mired-H$(K^{-1})$, if one million times the reciprocal of the $T_{SSL-L}(K)$ is Mired-L$(K^{-1})$, and if one million times the reciprocal of the $T_{SSL2}(K)$ is Mired-2$(K^{-1})$, $$\text{Mired-2}(K^{-1}) = \text{Mired-}L(K^{-1}) + (\text{Mired-}H(K^{-1}) - \text{Mired-}L(K^{-1})) \times \{(\tfrac{1}{2}) \pm x\},$$

where x is preferably 0.35 or less, more preferably 0.30 or less, and still more preferably 0.25 or less.

The technical meaning of Mired-H$(K^{-1})$, Mired-L$(K^{-1})$ and Mired-2$(K^{-1})$ can be easily understood by those skilled in the art at the time of the application.

(Fourth Light-Emitting Device)

The illumination system according to the present embodiment preferably further includes a fourth light-emitting device.

The space mainly illuminated by the fourth light-emitting device is a space which is neither a display item mainly illuminated by the first light-emitting device, a space mainly illuminated by the second light-emitting device, nor a space mainly illuminated by the third light-emitting device, and is a space around a space where the display item is displayed. The space is, for example, a space around a closed space when a space where a display item is displayed is the closed space provided with an entrance and the entrance is not closed. Therefore, examples of the fourth light-emitting device include: a light-emitting device mainly illuminating a store next to a store which is assumed to be a store that is a closed space provided with an entrance not closed in a shopping mall as a space where a display item is displayed; a light-emitting device mainly illuminating the store opposite to the store; and a light-emitting device mainly illuminating a passage adjacent to the entrance of the store.

As described above, the illumination system according to the present embodiment includes the first light-emitting device and the second light-emitting device, and in addition, may include the third light-emitting device and may not include the fourth light-emitting device, may not include the third light-emitting device and may include the fourth light-emitting device, or may include the third light-emitting device and may further include the fourth light-emitting device.

The light field of the fourth light-emitting device may include any of the light field of the first light-emitting device, the light field of the second light-emitting device, and the light field of the third light-emitting device.

The fourth light-emitting device is a light-emitting device that does not satisfy at least one of the conditions that the first light-emitting device satisfies, and does not satisfy at least one of the conditions that the second light-emitting device satisfies. Examples thereof include an LED light-emitting device, an incandescent lamp, a fluorescent lamp, a xenon lamp, a mercury lamp, and an organic EL.

(Relationship Between First Light-Emitting Device, Second Light-Emitting Device, and Fourth Light-Emitting Device)

When the illumination system according to the present embodiment includes the first light-emitting device and the second light-emitting device, and does not include the third light-emitting device but the fourth light-emitting device, it is preferable that the relationship between the first light-emitting device, the second light-emitting device, and the fourth light-emitting device satisfies at least one of the following conditions (IX-1) to (IX-4). As a result, respective lights emitted from the three light-emitting devices produce gradation without a sense of incongruity as a whole.

An aspect satisfying both the following condition (IX-1) and the following condition (IX-2) is preferable, and an aspect satisfying both the following condition (IX-3) and the following condition (IX-4) is also preferable.

It is preferable to satisfy all of the following conditions (IX-1) to (IX-4).

(IX-1)

If $D_{uv}$ of the first light-emitting device is $D_{uvSSL1}$, if $D_{uv}$ of the second light-emitting device is $D_{uvSSL2}$, and if $D_{uv}$ of the fourth light-emitting device is $D_{uvSSL4}$, $$D_{uvSSL1} < D_{uvSSL2} < D_{uvSSL4}$$

is satisfied.

$$D_{uvSSL2} = D_{uvSSL1} + (D_{uvSSL4} - D_{uvSSL1}) \times \{(\tfrac{1}{2}) \pm x\} \quad \text{(IX-2)}$$

is satisfied, where x is preferably 0.35 or less, more preferably 0.30 or less, and still more preferably 0.25 or less.

(IX-3)

If the average of $\Delta C_n$ (n is every integer from 1 to 15) of the first light-emitting device is $SAT_{ave1}$, if the average of $\Delta C_n$ (n is every integer from 1 to 15) of the second light-emitting device is $SAT_{ave2}$, and if the average of $\Delta C_n$ (n is every integer from 1 to 15) of the fourth light-emitting device defined in the same manner as in the case of the first light-emitting device is $SAT_{ave4}$, $$SAT_{ave4} < SAT_{ave2} < SAT_{ave1}$$

is satisfied.

$$SAT_{ave2} = SAT_{ave1} + (SAT_{ave4} - SAT_{ave1}) \times \{(\tfrac{1}{2}) \pm x\} \quad \text{(IX-4)}$$

is satisfied, where x is preferably 0.35 or less, more preferably 0.30 or less, and still more preferably 0.25 or less.

In the illumination system according to the present embodiment, the first light-emitting device, the second light-emitting device, and the fourth light-emitting device preferably satisfy the following condition (IX-5).

(IX-5)

If the correlated color temperature of light emitted from the first light-emitting device in the radiant direction is $T_{SSL1}(K)$, if the correlated color temperature of light emitted from the second light-emitting device in the radiant direction is $T_{SSL2}(K)$, if the correlated color temperature of light emitted from the fourth light-emitting device in the radiant direction is $T_{SSL4}(K)$, if, comparing the $T_{SSL2}(K)$ with the $T_{SSL4}(K)$, the larger one is $T_{SSL-H}(K)$, and the smaller one is $T_{SSL-L}(K)$, and if one million times the reciprocal of the $T_{SSL-H}(K)$ is Mired-H($K^{-1}$), if one million times the reciprocal of the $T_{SSL-L}(K)$ is Mired-L($K^{-1}$), and if one million times the reciprocal of the $T_{SSL2}(K)$ is Mired-2($K^{-1}$), $$\text{Mired-}2(K^{-1})=\text{Mired-}L(K^{-1})+(\text{Mired-}H(K^{-1})-\text{Mired-}L(K^{-1}))\times\{(\tfrac{1}{2})\pm x\},$$

where x is preferably 0.35 or less, more preferably 0.30 or less, and still more preferably 0.25 or less.

The technical meaning of Mired-H($K^{-1}$), Mired-L($K^{-1}$) and Mired-2($K^{-1}$) can be easily understood by those skilled in the art at the time of the application.

(Relationship Between First Light-Emitting Device, Second Light-Emitting Device, Third Light-Emitting Device, and Fourth Light-Emitting Device)

When the illumination system according to the present embodiment includes the first to fourth light-emitting devices, in the illumination system according to the present embodiment, the relationship between the first to fourth light-emitting devices satisfies all of the following conditions (X-1) to (X-3).

An aspect in which all of the following conditions (X-4) to (X-6) are satisfied is also preferable.

As a result, respective lights emitted from the four light-emitting devices produce gradation without a sense of incongruity as a whole.

(X-1)

If $D_{uv}$ of the first light-emitting device is $D_{uvSSL1}$, if $D_{uv}$ of the second light-emitting device is $D_{uvSSL2}$, if $D_{uv}$ of the third light-emitting device is $D_{uvSSL3}$, and if $D_{uv}$ of the fourth light-emitting device is $D_{uvSSL4}$, $$D_{uvSSL1}<D_{uvSSL2}<D_{uvSSL3}<D_{uvSSL4}$$

is satisfied.

$$D_{uvSSL2}=D_{uvSSL1}+(D_{uvSSL3}-D_{uvSSL1})\times\{(\tfrac{1}{2})\pm x\} \quad (X\text{-}2)$$

is satisfied, where x is preferably 0.35 or less, more preferably 0.30 or less, and still more preferably 0.25 or less.

$$D_{uvSSL3}=D_{uvSSL2}+(D_{uvSSL4}-D_{uvSSL2})\times\{(\tfrac{1}{2})\pm x\} \quad (X\text{-}3)$$

is satisfied, where x is preferably 0.35 or less, more preferably 0.30 or less, and still more preferably 0.25 or less.

(X-4)

If the average of $\Delta C_n$ (n is every integer from 1 to 15) of the first light-emitting device is $SAT_{ave1}$, if the average of $\Delta C_n$ (n is every integer from 1 to 15) of the second light-emitting device is $SAT_{ave2}$, if the average of $\Delta C_n$ (n is every integer from 1 to 15) of the third light-emitting device is $SAT_{ave3}$, and if the average of $\Delta C_n$ (n is every integer from 1 to 15) of the fourth light-emitting device is $SAT_{ave4}$, $$SAT_{ave4}<SAT_{ave3}<SAT_{ave2}<SAT_{ave1}$$

is satisfied.

$$SAT_{ave2}=SAT_{ave1}+(SAT_{ave3}-SAT_{ave1})\times\{(\tfrac{1}{2})\pm x\} \quad (X\text{-}5)$$

is satisfied, where x is preferably 0.35 or less, more preferably 0.30 or less, and still more preferably 0.25 or less.

$$SAT_{ave3}=SAT_{ave2}+(SAT_{ave4}-SAT_{ave2})\times\{(\tfrac{1}{2})\pm x\} \quad (X\text{-}6)$$

is satisfied, where x is preferably 0.35 or less, more preferably 0.30 or less, and still more preferably 0.25 or less.

2. Second Embodiment

A second embodiment of the present invention is an illumination method of illuminating a space where a display item is displayed, wherein the illumination method includes a first illuminating step mainly illuminating the display item with a first light-emitting device satisfying a predetermined condition, and a second illuminating step mainly illuminating a space other than the display item with a second light-emitting device satisfying a predetermined condition.

Another aspect is an illumination method of illuminating a space where a display item is displayed, wherein the illumination method includes a first illuminating step mainly illuminating the display item with a first light-emitting device satisfying a predetermined condition, a second illuminating step mainly illuminating a space other than the display item with a second light-emitting device satisfying a predetermined condition, and a fourth illuminating step mainly illuminating a space around the space where the display item is displayed with a fourth light-emitting device satisfying a predetermined condition.

The description of the predetermined conditions is understood with reference to the contents of Patent Document 1 and Patent Document 2.

The first light-emitting device used in the illumination method may be one type or two or more types, and may be one or two or more in number as long as a predetermined condition is satisfied. The same applies to second to fourth light-emitting devices used in the illumination method.

Hereinafter, although preferable conditions each of the first to fourth illuminating steps used in the illumination method satisfies are described, any illuminating step may satisfy at least one of the predetermined conditions, and it is preferable to satisfy more conditions.

(Display Item)

The description of a display item in the first embodiment of the present invention is incorporated in the description of a display item in the present embodiment.

(Space where Display Item is Displayed)

The description of a space where a display item is displayed in the first embodiment of the present invention is incorporated in the description of a space where a display item is displayed in the present embodiment.

(First Illuminating Step)

(I)

The first illuminating step is an illuminating step for mainly illuminating a display item with the first light-emitting device in which light measured at the position of a display item when light emitted from the first light-emitting device mainly lights the display item lights in such a manner to satisfy a predetermined condition.

The description of the first light-emitting device described in the first embodiment of the present invention is incorporated in the description of "mainly illuminating a display item" by the first light-emitting device.

(I'-1)

$D_{uv}$ is from −0.0300 to −0.0050.

$D_{uv}$ is preferably −0.0120 or more, more preferably −0.0110 or more, further preferably −0.0100 or more, still more preferably −0.0095 or more. On the other hand, $D_{uv}$ is preferably −0.0052 or less more, preferably −0.0053 or less, and further preferably −0.0055 or less.

(I'-2)

if an a* value and a b* value in CIE 1976 L*a*b* color space of 15 Munsell renotation color samples from #01 to #15 listed below when mathematically assuming illumination by the light measured at the position of the display item are respectively denoted by $a^*_{nSSL}$ and $b^*_{nSSL}$ (where n is a natural number from 1 to 15), and if an a* value and a b* value in CIE 1976 L*a*b* color space of the 15 Munsell renotation color samples when mathematically assuming illumination by a reference light that is selected according to a correlated color temperature $T_{SSL}(K)$ of the light measured at the position of the display item are respectively denoted by $a^*_{nref}$ and $b^*_{nref}$ (where n is a natural number from 1 to 15), then, each saturation difference $\Delta C_n$ (n is a natural number from 1 to 15) is from −3.8 to 18.6, where $\Delta C_n$ (n is a natural number from 1 to 15)=$\sqrt{\{(a^*_{nSSL})^2+(b^*_{nSSL})^2\}}-\sqrt{\{(a^*_{nref})^2+(b^*_{nref})^2\}}$.

$\Delta C_n$ (n is a natural number from 1 to 15) is preferably −3.0 or more, more preferably −2.8 or more, and further preferably −2.5 or more. On the other hand, $\Delta C_n$ is preferably 17.0 or less, more preferably 16.0 or less, and further preferably 15.0 or less.

(I'-3)

The average of the $\Delta C_n$ (n is every integer from 1 to 15) is from 0.5 to 10.0.

The average of the $\Delta C_n$ (n is every integer from 1 to 15) is preferably 1.0 or more, more preferably 1.5 or more, and further preferably 2.0 or more. On the other hand, the average is preferably 7.0 or less, more preferably 6.8 or less, further preferably 6.5 or less, and more further preferably 5.0 or less.

(I'-4)

The saturation difference $\Delta C_{14}$ of the illuminating step satisfies $$0 \leq \Delta C_{14},$$

where $\Delta C_{14}$ represents the $\Delta C_n$ when n=14.

$\Delta C_{14}$ is preferably 0.3 or more, more preferably 0.5 or more, further preferably 1.0 or more. On the other hand, $\Delta C_{14}$ is preferably 15.0 or less, more preferably 10.0 or less, and further preferably 8.0 or less.

In the illuminating step, preferably, light measured at the position of a display item when light emitted from the first light-emitting device mainly lights the display item further satisfies the following condition.

(I'-5)

Regarding light measured at the position of the display item in the first illuminating step, if a spectral power distribution is denoted by $\varphi_{SSL}(\lambda)$, a spectral power distribution of a reference light that is selected according to $T_{SSL}(K)$ is denoted by $\varphi_{ref}(\lambda)$, tristimulus values are denoted by $(X_{SSL}, Y_{SSL}, Z_{SSL})$, and tristimulus values of the reference light that is selected according to $T_{SSL}(K)$ are denoted by $(X_{ref}, Y_{ref}, Z_{ref})$, and if a normalized spectral power distribution $S_{SSL}(\lambda)$ of light emitted from the light-emitting device in the radiant direction, a normalized spectral power distribution $S_{ref}(\lambda)$ of a reference light that is selected according to $T_{SSL}(K)$ of the light emitted from the light-emitting device in the radiant direction, and a difference $\Delta S_{SSL}(\lambda)$ between these normalized spectral power distributions are respectively defined as $$S_{SSL}(\lambda)=\varphi_{SSL}(\lambda)/Y_{SSL},$$

$$S_{ref}(\lambda)=\varphi_{ref}(\lambda)/Y_{ref} \text{ and}$$

$$\Delta S_{SSL}(\lambda)=S_{ref}(\lambda)-S_{SSL}(\lambda) \text{ and}$$

in the case when a wavelength that produces a longest wavelength local maximum value of $S_{SSL}(\lambda)$ in a wavelength range from 380 nm to 780 nm is denoted by $\lambda_R$ (nm), and a wavelength $\lambda_4$ that assumes $S_{SSL}(\lambda_R)/2$ exists on a longer wavelength-side of $\lambda_R$, an index $A_{cg}$ represented by the following Expression (1) is from −30 to 120, and on the other hand, in the case when a wavelength that produces a longest wavelength local maximum value of the $S_{SSL}(\lambda)$ in a wavelength range from 380 nm to 780 nm is denoted by $\lambda_R$ (nm), and a wavelength $\lambda_4$ that assumes $S_{SSL}(\lambda_R)/2$ does not exist on a longer wavelength-side of $\lambda_R$, an index $A_{cg}$ represented by the following Expression (2) is from −30 to 120.

[Expression 7]
$$A_{cg} = \int_{380}^{495} \Delta S(\lambda) d\lambda + \int_{495}^{590} (-\Delta S(\lambda)) d\lambda + \int_{590}^{\lambda_4} \Delta S(\lambda) d\lambda \quad (1)$$

[Expression 8]
$$A_{cg} = \int_{380}^{495} \Delta S(\lambda) d\lambda + \int_{495}^{590} (-\Delta S(\lambda)) d\lambda + \int_{590}^{780} \Delta S(\lambda) d\lambda \quad (2)$$

The index $A_{cg}$ is preferably −28 or more, more preferably −27 or more, and still more preferably −25 or more. On the other hand, the index $A_{cg}$ is preferably 80 or less, more preferably 50 or less, and still more preferably 0 or less.

(Second Illuminating Step)

(II')

The second illuminating step is an illuminating step of mainly illuminating a space other than the display item that is mainly illuminated by the first light-emitting device with the second light-emitting device, in which light measured in a space other than the display item when light emitted from the second light-emitting device mainly lights the space other than the display item lights in such a manner to satisfy a predetermined condition.

The description of the second light-emitting device described in the first embodiment of the present invention is incorporated in the description of "mainly illuminating a space other than a display item" by the second light-emitting device.

(II'-1)

$D_{uv}$ is from −0.0070 to less than 0.

$D_{uv}$ is preferably −0.0069 or more, more preferably −0.0068 or more, and further preferably −0.0065 or more. On the other hand, $D_{uv}$ is preferably −0.0010 or less, more preferably −0.0015 or less, and further preferably −0.0025 or less.

(II'-2)

Regarding light measured in a space other than the display item, the saturation difference $\Delta C_n$ (n is a natural number from 1 to 15) as defined in the same manner as in the case of the first illuminating step is from −3.8 to 18.6.

The saturation difference $\Delta C_n$ (n is a natural number from 1 to 15) is preferably −3.0 or more, more preferably −2.8 or more, and further preferably −2.5 or more. On the other hand, $\Delta C_n$ is preferably 17.0 or less, more preferably 16.0 or less, and further preferably 15.0 or less.

(II'-3)

The average of the $\Delta C_n$ (n is every integer from 1 to 15) is from 0.5 to 10.0.

The average of the $\Delta C_n$ (n is every integer from 1 to 15) is preferably 0.55 or more, more preferably 0.6 or more, and further preferably 0.7 or more. On the other hand, the average is preferably 7.0 or less, more preferably 6.5 or less, further preferably 5.5 or less, and more further preferably 4.0 or less.

(II'-4)

The saturation difference $\Delta C_{14}$ of the illuminating step satisfies $$0 \leq \Delta C_{14},$$

where $\Delta C_{14}$ represents the $\Delta C_n$ when n=14.

$\Delta C_{14}$ is preferably 0.3 or more, more preferably 0.5 or more, further preferably 1.0 or more. On the other hand, $\Delta C_{14}$ is preferably 15.0 or less, more preferably 10.0 or less, and further preferably 8.0 or less.

In the illuminating step, preferably, light measured in a space other than a display item when light emitted from the second light-emitting device mainly lights the space other than the display item further satisfies the following condition.

(II'-5)

Regarding light measured in the space other than the display item mainly illuminated by the first light-emitting device in the second illuminating step, as defined in the same manner as in the case of the first illuminating step, an index $A_{cg}$ represented by the above-described Expression (1) is from −30 to 120, and on the other hand, an index $A_{cg}$ represented by the above-described Formula (2) is from −30 to 120.

The index $A_{cg}$ is preferably −10 or more, more preferably −5 or more, and still more preferably 0 or more. On the other hand, the index $A_{cg}$ is preferably 118 or less, more preferably 116 or less, and still more preferably 115 or less.

(Relationship Between First Illuminating Step and Second Illuminating Step)

In the illumination method according to the present embodiment, the relationship between the first illuminating step and the second illuminating step further satisfies the following condition.

(III')

if the average of $\Delta C_n$ (n is every integer from 1 to 15) of the first illuminating step is $SAT_{ave1}$, and if the average of $\Delta C_n$ (n is every integer from 1 to 15) of the second illuminating step is $SAT_{ave2}$, $$SAT_{ave2} < SAT_{ave1}$$

is satisfied.

In the illumination method according to the present embodiment, the relationship between the first illuminating step and the second illuminating step preferably further satisfies the following condition.

(IV')

if $D_{uv}$ of the first illuminating step is $D_{uvSSL1}$, and if $D_{uv}$ of the second illuminating step is $D_{uvSSL2}$, $$D_{uvSSL1} < D_{uvSSL2}$$

is satisfied.

(V')

$|D_{uvSSL2} - D_{uvSSL1}|$ which is a difference between the $D_{uvSSL2}$ and the $D_{uvSSL2}$ is more than 0 to 0.0070.

The difference $|D_{uvSSL2} - D_{uvSSL1}|$ is preferably 0.0010 or more, more preferably 0.0012 or more, and still more preferably 0.0015 or more. On the other hand, the difference is preferably 0.0065 or less, more preferably 0.0060 or less, and still more preferably 0.0040 or less.

(VI')

if the index $A_{cg}$ of the first illuminating step is $A_{cg}(\varphi_{SSL}(\lambda))$, and if the index $A_{cg}$ of the second illuminating step is $A_{cg}(\varphi_{SSL2}(\lambda))$, $$A_{cg}(\varphi_{SSL1}(\lambda)) < A_{cg}(\alpha_{SSL2}(\lambda))$$

is satisfied.

(VII')

$D_{uvSSL2}/D_{uvSSL1}$ which is the ratio of $D_{uvSSL2}$ to $D_{uvSSL1}$ is from 0.25 to 0.75.

The ratio $D_{uvSSL2}/D_{uvSSL1}$ is preferably 0.30 or more, more preferably 0.35 or more, and still more preferably 0.40 or more. On the other hand, the ratio is preferably 0.70 or less, more preferably 0.65 or less, and still more preferably 0.60 or less.

(Third Illuminating Step)

The illumination method according to the present embodiment preferably further includes a third illuminating step.

The third illuminating step is a step of mainly illuminating a space which is neither a display item mainly illuminated by the first light-emitting device nor a space mainly illuminated by the second light-emitting device with the third light-emitting device. The space mainly illuminated by the third light-emitting device is a space where the display item is displayed is a closed space provided with at least one entrance, and one or more entrances of the entrances.

The illumination method according to the present embodiment includes the first illuminating step and the second illuminating step, and in addition, may include the third illuminating step and may not include the fourth illuminating step described below, may not include the third illuminating step and may include the fourth illuminating step described below, or may include the third illuminating step and may further include the fourth illuminating step described below.

The description of the third light-emitting device described in the first embodiment of the present invention is incorporated in the description of the third light-emitting device.

(Relationship Between First Illuminating Step, Second Illuminating Step, and Third Illuminating Step)

When the illumination method according to the present embodiment includes the first illuminating step and the second illuminating step, and does not include the fourth illuminating step described below but includes the third illuminating step, the illumination method according to the present embodiment preferably satisfies at least one of the following conditions (VIII'-1) to (VIII'-4). As a result, respective lights emitted from the three light-emitting devices produce gradation without a sense of incongruity as a whole.

In other words, light measured at the position of a display item when light emitted from the first light-emitting device mainly lights the display item in the first illuminating step, light measured in a space other than the display item when light emitted from the second light-emitting device mainly lights the space other than the display item mainly illuminated by the first light-emitting device in the second illuminating step, and light measured at one or more of entrances when light emitted from the third light-emitting device mainly illuminates the space where the display item is displayed is a closed space provided with at least one entrance, and one or more entrances of the entrances in the third illuminating step preferably satisfy at least one of the following conditions (VIII'-1) to (VIII'-4).

An aspect satisfying both the following condition (VIII'-1) and the following condition (VIII'-2) is preferable, and an aspect satisfying both the following condition (VIII'-3) and the following condition (VIII'-4) is also preferable.

It is preferable to satisfy all of the following conditions (VIII'-1) to (VIII'-4).

(VIII'-1)

If $D_{uv}$ of the first illuminating step is $D_{uvSSL1}$, if $D_{uv}$ of the second illuminating step is $D_{SSL2}$, and if $D_{uv}$ of the third illuminating step is $D_{uvSSL3}$, then $$D_{uvSSL2} < D_{uvSSL2} < D_{uvSSL3}$$

is satisfied.

$$D_{uvSSL2} = D_{uvSSL1} + (D_{uvSSL3} - D_{uvSSL1}) \times \{(\tfrac{1}{2}) \pm x\} \quad \text{(VIII'-2)}$$

is satisfied, where x is preferably 0.35 or less, more preferably 0.30 or less, and still more preferably 0.25 or less.

(VIII'-3)

If the average of $\Delta C_n$ (n is every integer from 1 to 15) of the first illuminating step is $SAT_{ave1}$, if the average of $\Delta C_n$ (n is every integer from 1 to 15) of the second illuminating step is $SAT_{ave2}$, and if the average of $\Delta C_n$ (n is every integer from 1 to 15) of the third illuminating step defined in the same manner as in the case of the first illuminating step is $SAT_{ave3}$, $$SAT_{ave3} < SAT_{ave2} < SAT_{ave1}.$$

is satisfied.

$$SAT_{ave2} = SAT_{ave1} + (SAT_{ave3} - SAT_{ave1}) \times \{(\tfrac{1}{2}) \pm x\} \quad \text{(VIII'4)}$$

is satisfied, where x is preferably 0.35 or less, more preferably 0.30 or less, and still more preferably 0.25 or less.

The illumination method according to the present embodiment preferably satisfies the following condition (VIII'-5).

(VIII'-5)

If the correlated color temperature of light measured at the position of a display item when light emitted from the first light-emitting device mainly lights the display item in the first illuminating step is $T_{SSL1}(K)$, if the correlated color temperature of light measured in a space other than the display item when light emitted from the second light-emitting device mainly lights the space other than the display item mainly illuminated by the first light-emitting device in the second illuminating step is $T_{SSL2}(K)$, if the correlated color temperature of light measured at one or more of entrances when light emitted from the third light-emitting device mainly illuminates the space where the display item is displayed is a closed space provided with at least one entrance, and one or more entrances of the entrances in the third illuminating step is $T_{SSL3}(K)$, if, comparing the $T_{SSL1}(K)$ with the $T_{SSL3}(K)$, the larger one is $T_{SSL-H}(K)$, and the smaller one is $T_{SSL-L}(K)$, and if one million times the reciprocal of the $T_{SSL-H}(K)$ is Mired-H $(K^{-1})$, if one million times the reciprocal of the $T_{SSL-L}(K)$ is Mired-L$(K^{-1})$, and if one million times the reciprocal of the $T_{SSL2}(K)$ is Mired-2$(K^{-1})$, $$\text{Mired-2}(K^{-1}) = \text{Mired-}L(K^{-1}) + (\text{Mired-}H(K^{-1}) - \text{Mired-}L(K^{-1})) \times \{(\tfrac{1}{2}) \pm x\},$$

where x is preferably 0.35 or less, more preferably 0.30 or less, and still more preferably 0.25 or less.

The technical meaning of Mired-H$(K^{-1})$, Mired-L$(K^{-1})$ and Mired-2$(K^{-1})$ can be easily understood by those skilled in the art at the time of the application.

(Fourth Illuminating Step)

The illumination method according to the present embodiment preferably further includes a fourth illuminating step.

The fourth illuminating step is a step of mainly illuminating a space which is neither a display item mainly illuminated by the first light-emitting device, a space mainly illuminated by the second light-emitting device, nor a space mainly illuminated by the third light-emitting device, and is a space around a space where the display item is displayed with the fourth light-emitting device. The space therearound is, for example, a space around a closed space when a space where a display item is displayed is the closed space provided with an entrance and the entrance is not closed. Therefore, examples of the fourth illuminating step include: a step of mainly illuminating a store next to a store which is assumed to be a store that is a closed space provided with an entrance not closed in a shopping mall as a space where a display item is displayed with the fourth light-emitting device; a step of mainly illuminating the store opposite to the store with the fourth light-emitting device; and a step of mainly illuminating a passage adjacent to the entrance of the store with the fourth light-emitting device.

As described above, the illumination method according to the present embodiment includes the first illuminating step and the second illuminating step, and in addition, may include the third illuminating step and may not include the fourth illuminating step, may not include the third illuminating step and may include the fourth illuminating step, or may include the third illuminating step and may further include the fourth illuminating step.

The description of the fourth light-emitting device described in the first embodiment of the present invention is incorporated in the description of the fourth light-emitting device.

(Relationship Between First Illuminating Step, Second Illuminating Step, and Fourth Illuminating Step)

When the illumination method according to the present embodiment includes the first illuminating step and the second illuminating step, and does not include the third illuminating step but the fourth illuminating step, it is preferable that the relationship between the first illuminating step, the second illuminating step, and the fourth illuminating step satisfies at least one of the following conditions (IX'-1) to (IX'-4). As a result, respective lights emitted from the three light-emitting devices produce gradation without a sense of incongruity as a whole.

In other words, light measured at the position of a display item when light emitted from the first light-emitting device mainly lights the display item in the first illuminating step, light measured in a space other than the display item when light emitted from the second light-emitting device mainly lights the space other than the display item mainly illuminated by the first light-emitting device in the second illuminating step, and light measured in a space around the space where the display item is displayed when light emitted from the fourth light-emitting device mainly lights the space therearound in the fourth illuminating step preferably satisfy at least one of the following conditions (IX'-1) to (IX'-4).

An aspect satisfying both the following condition (IX'-1) and the following condition (IX'-2) is preferable, and an aspect satisfying both the following condition (IX-3') and the following condition (IX-4') is also preferable.

It is preferable to satisfy all of the following conditions (IX'-1) to (IX'-4).

(IX'-1)

If $D_{uv}$ of the first illuminating step is $D_{uvSSL1}$, if Duv of the second illuminating step is $D_{uvSSL2}$, and if $D_{uv}$ of the fourth illuminating step is $D_{uvSSL4}$, $$D_{uvSSL2} < D_{uvSSL2} < D_{uvSSL4}$$

is satisfied.

$$D_{uvSSL2} = D_{uvSSL1} + (D_{uvSSL4} - D_{uvSSL2}) \times \{(1/2) \pm x\} \quad \text{(IX'-2)}$$

is satisfied, where x is preferably 0.35 or less, more preferably 0.30 or less, and further preferably 0.25 or less.

(IX'-3)

if the average of $\Delta C_n$ (n is every integer from 1 to 15) of the first illuminating step is $SAT_{ave1}$, if the average of $\Delta C_n$ (n is every integer from 1 to 15) of the second illuminating step is $SAT_{ave2}$, and if the average of $\Delta C_n$ (n is every integer from 1 to 15) of the fourth illuminating step which is defined in the same manner as in the case of the first illuminating step is $SAT_{ave4}$, $$SAT_{ave4} < SAT_{ave2} < SAT_{ave1}$$

is satisfied.

$$SAT_{ave2} = SAT_{ave1} + (SAT_{ave4} - SAT_{ave1}) \times \{(1/2) \pm x\} \quad \text{(IX'-4)}$$

is satisfied, where x is preferably 0.35 or less, more preferably 0.30 or less, and further preferably 0.25 or less.

The illumination method according to the present embodiment preferably satisfies the following condition (IX'-5).

(IX'-5)

If the correlated color temperature of light measured at the position of a display item when light emitted from the first light-emitting device mainly lights the display item in the first illuminating step is $T_{SSL1}(K)$, if the correlated color temperature of light measured in a space other than the display item when light emitted from the second light-emitting device mainly lights the space other than the display item mainly illuminated by the first light-emitting device in the second illuminating step is $T_{SSL2}(K)$, if the correlated color temperature of light measured in a space around the space where the display item is displayed when light emitted from the fourth light-emitting device mainly lights the space therearound in the fourth illuminating step is $T_{SSL4}(K)$, if, comparing the $T_{SSL1}(K)$ with the $T_{SSL4}(K)$, the larger one is $T_{SSL-H}(K)$ and the smaller one is $T_{SSL-L}(K)$, and if one million times the reciprocal of the $T_{SSL-H}(K)$ is Mired-H($K^{-1}$), if one million times the reciprocal of the $T_{SSL-L}(K)$ is Mired-L($K^{-1}$), and if one million times the reciprocal of the $T_{SSL2}(K)$ is Mired-2($K^{-1}$), $$\text{Mired-2}(K^{-1}) = \text{Mired-}L(K^{-1}) + (\text{Mired-}H(K^{-1}) - \text{Mired-}L(K^{-1})) \times \{(1/2) \pm x\},$$

where x is 0.35 or less, more preferably 0.30 or less, and still more preferably 0.25 or less.

The technical meaning of Mired-H($K^{-1}$), Mired-L($K^{-1}$) and Mired-2($K^{-1}$) can be easily understood by those skilled in the art at the time of the application.

(Relationship Between First Illuminating Step, Second Illuminating Step, Third Illuminating Step, and Fourth Illuminating Step)

When the illumination method according to the present embodiment includes the first to fourth illuminating steps, the illumination method according to the present embodiment satisfies all of the following conditions (X'-1) to (X'-3).

An aspect in which all of the following conditions (X'-4) to (X'-6) are satisfied is also preferable.

As a result, respective lights emitted from the four light-emitting devices produce gradation without a sense of incongruity as a whole.

$$D_{uvSSL1} < D_{uvSSL2} < D_{uvSSL3} < D_{uvSSL4} \quad \text{(X'-1)}$$

is satisfied.

$$D_{uvSSL2} = D_{uvSSL1} + (D_{uvSSL3} - D_{uvSSL1}) \times \{(1/2) \pm x\} \quad \text{(X'-2)}$$

is satisfied, where x is preferably 0.35 or less, more preferably 0.30 or less, and further preferably 0.25 or less.

$$D_{uvSSL3} = D_{uvSSL2} + (D_{uvSSL4} - D_{uvSSL2}) \times \{(1/2) \pm x\} \quad \text{(X'-3)}$$

is satisfied, where x is preferably 0.35 or less, more preferably 0.30 or less, and further preferably 0.25 or less.

$$SAT_{ave4} < SAT_{ave3} < SAT_{ave2} < SAT_{ave1} \quad \text{(X'-4)}$$

is satisfied.

$$SAT_{ave2} = SAT_{ave1} + (SAT_{ave3} - SAT_{ave1}) \times \{(1/2) \pm x\} \quad \text{(X'-5)}$$

is satisfied, where x is preferably 0.35 or less, more preferably 0.30 or less, and still more preferably 0.25 or less.

$$SAT_{ave3} = SAT_{ave2} + (SAT_{ave4} - SAT_{ave2}) \times \{(1/2) \pm x\} \quad \text{(X'-6)}$$

is satisfied, where x is preferably 0.35 or less, more preferably 0.30 or less, and still more preferably 0.25 or less.

3. Preferred Embodiment of Light-Emitting Device

Preferred embodiments of the light-emitting device used in the first embodiment and the second embodiment of the present invention will be described below, but are not limited to those used in the following description.

First, in a short-wavelength region from λ1 (380 nm) to λ2 (495 nm) in applicable three wavelength regions, it is possible to include light emitted from any light source such as thermal radiation from a thermal filament or the like, discharge synchrotron radiation from a fluorescent tube, a high pressure sodium lamp, or the like, stimulated emission from a laser or the like, spontaneous emission from a semiconductor light-emitting element, or spontaneous emission from a phosphor. Among these, light emission from a photoexcited phosphor, light emission from a semiconductor light-emitting element, and light emission from a semiconductor laser are preferable because they are small in size, high in energy efficiency, and capable of relatively narrow band light emission.

As a semiconductor light-emitting element, a purple light-emitting element (peak wavelength is about from 395 nm to 420 nm), a blue violet light-emitting element (peak wavelength is about from 420 nm to 455 nm), or a blue light-emitting element (peak wavelength is about from 455 nm to 485 nm) containing In(Al)GaN-based material in an active layer structure formed on a sapphire substrate or a GaN substrate is preferable. Further, a blue light-emitting element (peak wavelength is about from 455 nm to 485 nm) containing Zn(Cd) (S)Se-based material formed on a GaAs substrate in an active layer structure is also preferable.

Next, in an intermediate-wavelength region from $\lambda 2$ (495 nm) to $\lambda 3$ (590 nm) in applicable three wavelength regions, it is possible to include light emitted from any light source such as thermal radiation from a thermal filament or the like, discharge synchrotron radiation from a fluorescent tube, a high pressure sodium lamp, or the like, stimulated emission from a laser or the like involving second harmonic generation (SHG) or the like using a nonlinear optical effect, spontaneous emission from a semiconductor light-emitting element, or spontaneous emission from a phosphor. Among these, light emission from a photoexcited phosphor, light emission from a semiconductor light-emitting element, and light emission from a semiconductor laser or an SHG laser are preferable because they are small in size, high in energy efficiency, and capable of relatively narrow band light emission.

As a semiconductor light-emitting element, a blue-green light-emitting element (peak wavelength is about from 495 nm to 500 nm), a green light-emitting element (peak wavelength is about from 500 nm to 530 nm), a yellow-green light-emitting element (peak wavelength is about from 530 nm to 570 nm), or a yellow light-emitting element (peak wavelength is about from 570 nm to 580 nm) containing In(Al)GaN-based material in an active layer structure on a sapphire substrate or a GaN substrate is preferable. A yellow-green light-emitting element (peak wavelength is about from 530 nm to 570 nm) with GaP on a GaP substrate and a yellow light-emitting element (peak wavelength is about from 570 nm to 580 nm) with GaAsP on a GaP substrate are also preferable. Further, a yellow light-emitting element (peak wavelength is about from 570 nm to 580 nm) with AlInGaP on a GaAs substrate is also preferable.

Next, in a long-wavelength region from $\lambda 3$ (590 nm) to 780 nm in applicable three wavelength regions, it is possible to include light emitted from any light source such as thermal radiation from a thermal filament or the like, discharge synchrotron radiation from a fluorescent tube, a high pressure sodium lamp, or the like, stimulated emission from a laser or the like, spontaneous emission from a semiconductor light-emitting element, or spontaneous emission from a phosphor. Among these, light emission from a photoexcited phosphor, light emission from a semiconductor light-emitting element, and light emission from a semiconductor laser are preferable because they are small in size, high in energy efficiency, and capable of relatively narrow band light emission.

As a semiconductor light-emitting element, an orange light-emitting device (peak wavelength is about from 590 nm to 600 nm), or a red light-emitting device (from 600 nm to 780 nm) containing an AlGaAs-based material formed on a GaAs substrate and an (Al) InGaP-based material formed on a GaAs substrate in an active layer structure is preferable. A red light-emitting element (from 600 nm to 780 nm) containing a GaAsP-based material formed on a GaP substrate in an active layer structure is preferable.

As the phosphor material in the short-wavelength region, the intermediate-wavelength region, and the long-wavelength region, a known phosphor can be used in any of the wavelength regions.

Specific examples of the green phosphor material in the intermediate-wavelength region used in the light-emitting device used in the first and second embodiments of the present invention include a green phosphor, of which host is $Ce^{3+}$ activated aluminate, $Ce^{3+}$ activated yttrium-aluminum oxide, $Eu^{2+}$ activated alkaline earth silicate crystals, or $Eu^{2+}$ activated alkaline earth-silicon nitride. These green phosphors can normally be excited using a semiconductor light-emitting element ranging from ultraviolet to blue.

Specific examples of the $Ce^{3+}$ activated aluminate phosphor include a green phosphor represented by the following general formula (1).

$$Y_a(Ce,Tb,Lu)_b(Ga,Sc)_cAl_dO_e \qquad (1)$$

(In the general formula (1), a, b, c, d and e satisfy a+b=3, $0 \le b \le 0.2$, $4.5 \le c+d \le 5.5$, $0.1 \le c \le 2.6$, and $10.8 \le e \le 13.4$.) ($Ce^{3+}$ activated aluminate phosphor represented by the general formula (1) is referred to as a G-YAG phosphor.)

Particularly in the case of a G-YAG phosphor, the composition range satisfying the general formula (1) can be appropriately selected. Further, preferable wavelength and full width at half maximum that give the maximum value of the emission intensity at the time of photoexcitation of a single phosphor in the light-emitting device used in the first embodiment and the second embodiment of the present invention are in the following ranges.

$0.01 \le b \le 0.05$ and $0.1 \le c \le 2.6$ is preferable,
$0.01 \le b \le 0.05$ and $0.3 \le c \le 2.6$ is more preferable, and
$0.01 \le b \le 0.05$ and $1.0 \le c \le 2.6$ is considerably preferable.
Also,
$0.01 \le b \le 0.03$ and $0.1 \le c \le 2.6$ is preferable,
$0.01 \le b \le 0.03$ and $0.3 \le c \le 2.6$ is more preferable, and
$0.01 \le b \le 0.03$ and $1.0 \le c \le 2.6$ is considerably preferable.

Specific examples of $Ce^{3+}$ activated yttrium-aluminum oxide phosphor include a green phosphor represented by the following general formula (2).

$$Lu_a(Ce,Tb,Y)_b(Ga,Sc)_cAl_dO_e \qquad (2)$$

(In the general formula (2), a, b, c, d, and e satisfy a+b=3, $0 \le b \le 0.2$, $4.5 \le c+d \le 5.5$, $0 \le c \le 2.6$, and $10.8 \le e \le 13.4$.) (the $Ce^{3+}$ activated yttrium-aluminum oxide phosphor represented by the general formula (2) is referred to as "LuAG phosphor".)

Particularly in the case of a LuAG phosphor, the composition range satisfying the general formula (2) can be appropriately selected. Further, preferable wavelength and full width at half maximum that give the maximum value of the emission intensity at the time of photoexcitation of a single phosphor in the light-emitting device used in the first embodiment and the second embodiment of the present invention are in the following ranges.

$0.00 \le b \le 0.13$ is preferable,
$0.02 \le b \le 0.13$ is more preferable, and
$0.02 \le b \le 0.10$ is considerably preferable.

Other examples include a green phosphor represented by the following general formula (3).

$$M^1_a M^2_b M^3_c O_d \qquad (3)$$

(in the general formula (3), $M^1$ indicates a bivalent metallic element, $M^2$ indicates a trivalent metallic element, and $M^3$ indicates a tetravalent metallic element, and a, b, c and d satisfy 2.7≤a≤3.3, 1.8≤b≤2.2, 2.7≤c≤3.3 and 11.0≤d≤13.0.) (phosphor represented by the general formula (3) is referred to as "CSMS phosphor".)

In the above-described general formula (3), M is a bivalent metallic element, and is preferably at least one type selected from the group consisting of Mg, Ca, Zn, Sr, Cd and Ba, further preferably Mg, Ca or Zn, and particularly preferably Ca. In this case, Ca may be a single system or may be a composite system with Mg. $M^1$ may include other bivalent metallic elements.

$M^2$ is a trivalent metallic element, and is preferably at least one type selected from the group consisting of Al, Sc, Ga, Y, In, La, Gd and Lu, further preferably Al, Sc, Y or Lu, and particularly preferably Sc. In this case, Sc may be a single system or may be a composite system with Y or Lu. $M^2$ must include Ce, and $M^2$ may include other trivalent metallic elements.

$M^3$ is a tetravalent metallic element, and preferably includes at least Si. An example of a tetravalent metallic element $M^3$, other than Si, is preferably at least one type selected from the group consisting of Ti, Ge, Zr, Sn and Hf, further preferably at least one type selected from the group consisting of Ti, Zr, Sn and Hf, and particularly preferably Sn. Particularly it is preferable that $M^3$ is Si. $M^3$ may include other tetravalent metallic elements.

Particularly in the case of a CSMS phosphor, the composition range satisfying the general formula (3) can be appropriately selected. Further, in order for the wavelength and the full width at half maximum that give the maximum value of the emission intensity at the time of photoexcitation of a single phosphor in the light-emitting device used in the first embodiment and the second embodiment of the present invention to be in preferable ranges, the lower limit of the ratio of Ce included in $M^2$ to the entire $M^2$ is preferably 0.01 or more, and more preferably 0.02 or more. Further, the upper limit of the ratio of Ce included in $M^2$ to the entire $M^2$ is preferably 0.10 or less, and more preferably 0.06 or less. Further, the lower limit of the ratio of Mg included in $M^1$ element to the entire $M^1$ is preferably 0.01 or more, and more preferably 0.03 or more. On the other hand, the upper limit is preferably 0.30 or less, and more preferably 0.10 or less.

Further examples thereof include a green phosphor represented by the following general formula (4).

$$M^1_a M^2_b M^3_c O_d \tag{4}$$

(In the general formula (4), M indicates an activator element including at least Ce, $M^2$ is a bivalent metallic element, and $M^3$ is a trivalent metallic element, and a, b, c and d satisfy 0.0001≤a≤S 0.2, 0.8≤b≤1.2, 1.6≤c≤2.4 and 3.2≤d≤4.8.) (a phosphor represented by the general formula (4) is referred to as "CSO phosphor".)

In the above-described general formula (4), $M^1$ is an activator element contained in a host crystal, and includes at least Ce. $M^1$ can contain at least one type of bivalent to tetravalent element selected from the group consisting of Cr, Mn, Fe, Co, Ni, Cu, Ce, Pr, Nd, Sm, Eu, Tb, Dy, Ho, Er, Tm and Yb.

$M^2$ is a bivalent metallic element, and is preferably at least one type selected from the group consisting of Mg, Ca, Zn, Sr, Cd and Ba, further preferably Mg, Ca or Sr, and is particularly preferably that Ca is 50 mol % or more of the elements of $M^2$.

$M^3$ is a trivalent metallic element, and is preferably at least one type selected from the group consisting of Al, Sc, Ga, Y, In, La, Gd, Yb and Lu, and further preferably Al, Sc, Yb or Lu, more further preferably Sc, or Sc and Al, or Sc and Lu, and is particularly preferably that Sc is 50 mol % or more of the elements of $M^3$.

$M^2$ and $M^3$ are a bivalent metallic element and trivalent metallic element respectively, and a small part of $M^2$ and/or $M^3$ may be a metallic element of which valence is any one of 1, 4 and 5, and a very small amount of anions, such as a halogen element (F, Cl, Br, I), nitrogen, sulfur, selenium or the like may be contained in the compound.

Particularly in the case of a CSO phosphor, the composition range satisfying the general formula (4) can be appropriately selected. Further, preferable wavelength and full width at half maximum that give the maximum value of the emission intensity at the time of photoexcitation of a single phosphor in the light-emitting device used in the first embodiment and the second embodiment of the present invention are in the following ranges.

0.005≤a≤0.200 is preferable,
0.005≤a≤0.012 is more preferable, and
0.007≤a≤0.012 is considerably preferable.

Furthermore, specific examples of green phosphors using an alkaline-earth silicate crystal as a host and $Eu^{2+}$ as an activator include a phosphor represented by the following general formula (5).

$$Ba_a Ca_b Sr_c Mg_d Eu_x SiO_4 \tag{5}$$

(In the general formula (5), a, b, c, d, and x satisfy a+b+c+d+x=2, 1.0≤a≤2.0, 0≤b<0.2, 0.2≤c≤1.0, 0≤d<0.2, and 0<x≤0.5.) (alkaline-earth silicate represented by the general formula (5) is referred to as a BSS phosphor.)

In the case of a BSS phosphor, the composition range satisfying the general formula (5) can be appropriately selected. Further, preferable wavelength and full width at half maximum that give the maximum value of the emission intensity at the time of photoexcitation of a single phosphor in the light-emitting device used in the first embodiment and the second embodiment of the present invention are in the following ranges.

0.20≤c≤1.00 and 0.25<x≤0.50 is more preferable, and
0.20≤c≤1.00 and 0.25<x≤0.30 is considerably preferable.
Also,
0.50≤c≤1.00 and 0.00<x≤0.50 is preferable,
0.50≤S≤1.00 and 0.25<x≤0.50 is more preferable, and
0.50≤c≤1.00 and 0.25<x≤0.30 is considerably preferable.

Furthermore, specific examples of phosphors using an alkaline-earth nitride silicate crystal as a host and $Eu^{2+}$ as an activator include a green phosphor represented by the following general formula (6).

$$(Ba,Ca,Sr,Mg,Zn,Eu)_3 Si_6 O_{12} N_2 \tag{6}$$

(This is referred to as a BSON phosphor.)

In the case of a BSON phosphor, the composition range satisfying the general formula (6) can be appropriately selected. Further, preferable wavelength and full width at half maximum that give the maximum value of the emission intensity at the time of photoexcitation of a single phosphor in the light-emitting device used in the first embodiment and the second embodiment of the present invention are in the following ranges.

In the general formula (6), a combination of Ba, Sr and Eu is preferably among the selectable bivalent metallic elements (Ba, Ca, Sr, Mg, Zn, Eu), and the ratio of Sr to Ba is preferably 10 to 30%.

When the above-described conditions are satisfied and effects of the first embodiment and the second embodiment of the present invention are obtained, still other examples may include a yellow phosphor such as a yttrium aluminum garnet phosphor represented by $(Y_{1-u}Gd_u)_3(Al_{1-v}Ga_v)_5O_{12}$: Ce, Eu (where u and v respectively satisfy $0≤u≤0.3$ and $0≤v≤0.5$) (this phosphor is referred to as a YAG phosphor) or a lanthanum silicon nitride phosphor represented by $Ca_{1.5x}La_{3-x}Si_6N_{11}$:Ce (where x satisfies $0≤x≤1$) (this phosphor is referred to as an LSN phosphor.) Furthermore, other examples may include a narrow band green phosphor represented by $Si_{6-z}Al_zO_zN_{8-z}$:Eu (where $0<z<4.2$) having $Eu^{2+}$ activated SiAlON crystal as a host (this phosphor is referred to as a β-SiAlON phosphor.) and $Ca_8MgSi_4O_{16}Cl_2$:Eu (this is called a chlorosilicate phosphor. A phosphor having the same crystal structure as the chlorosilicate phosphor and in which a part of the elements is substituted is also included in the chlorosilicate phosphor). However, as described above, when a light-emitting device is configured using only these narrow-band green phosphors and yellow phosphors as light-emitting elements in the intermediate-wavelength region, it is difficult to realize a desired color appearance of an illuminating target. Therefore, although in a light-emitting device used in the first and second embodiments of the present invention, it is possible to use a yellow phosphor or a narrow-band green phosphor in combination with another semiconductor light-emitting element, abroad-band phosphor, or the like, this is not always preferable. As the light-emitting element in the intermediate-wavelength region, it is preferable to use a broad-band green phosphor.

Specific examples of the long-wavelength region phosphor material used in the light-emitting device used in the first and second embodiments of the present invention include phosphors using $Eu^{2+}$ as an activator and a crystal constituted by alkaline-earth silicon-nitride, α-SiAlON, or alkaline-earth silicate as a host. A red phosphor of this type can normally be excited using a semiconductor light-emitting element ranging from ultraviolet to blue.

Specific examples of phosphors using an alkaline-earth silicon-nitride crystal as a host include a phosphor represented by $CaAlSiN_3$:Eu (this phosphor is referred to as a CASN phosphor), a phosphor represented by (Ca, Sr, Ba, Mg) $AlSiN_3$:Eu and/or (Ca, Sr, Ba) $AlSiN_3$:Eu (this phosphor is referred to as a SCASN phosphor), a phosphor represented by $(CaAlSiN_3)_{1-x}(Si_2N_2O)_x$:Eu (where x satisfies $0<x<0.5$) (this phosphor is referred to as a CASON phosphor), a phosphor represented by $(Sr, Ca, Ba)_2Al_xSi_{5-x}O_xN_{8-x}$:Eu (where $0≤x≤2$), and a phosphor represented by $Eu_y(Sr, Ca, Ba)_{1-y}Al_{1-x}Si_{4-x}O_xN_{7-x}$ (where $0≤x<4, 0≤y<0.2$).

Other examples include a $Mn^{4+}$-activated fluoride complex phosphor. A $Mn^{4+}$-activated fluoride complex phosphor is a phosphor which uses $Mn^{4+}$ as an activator and a fluoride complex salt of an alkali metal, amine, or an alkaline-earth metal as a host crystal. Fluoride complex salts which form the host crystal include those whose coordination center is a trivalent metal (B, Al, Ga, In, Y, Sc or a lanthanoid), a tetravalent metal (Si, Ge, Sn, Ti, Zr, Re or Hf), and a pentavalent metal (V, P, Nb or Ta), and the number of fluorine atoms coordinated around the center ranges from 5 to 7.

Specific examples of the $Mn^{4+}$-activated fluoride complex phosphor include $A_{2+x}M_yM_nF_n$ (where A is Na and/or K; M is Si and Al; and $-1≤x≤1$ and $0.9≤y+z≤1.1$ and $0.001≤z≤0.4$ and $5≤n≤7$) which uses a hexafluoro complex of an alkali metal as a host crystal. Among the above, specific examples thereof include phosphors in which A is one or more types selected from K (potassium) or Na (sodium) and M is Si (silicon), Ti (titanium) or Ge (germanium), such as $K_2SiF_6$: Mn (this phosphor is referred to as a KSF phosphor) or $K_2Si_{1-x}Na_xAl_xF_6$:Mn (this phosphor is referred to as a KSNAF phosphor) that is obtained by replacing a part (preferably, 10 mol % or less) of the components of $K_2SiF_6$: Mn with Al and Na; $K_2TiF_6$:Mn (this is referred to as KTF phosphor.), or $K_2GeF_6$:Mn (this is referred to as KGF phosphor.).

Other examples include a phosphor represented by the following general formula (7) and a phosphor represented by the following general formula (8).

$(La_{1-x-y}Eu_xLn_y)_2O_2S$      (7)

(In the general formula (7), x and y denote numbers respectively satisfying $0.02≤x≤0.50$ and $0≤y≤0.50$, and Ln denotes at least one trivalent rare-earth element among Y, Gd, Lu, Sc, Sm, and Er) (a lanthanum oxysulfide phosphor represented by the general formula (7) is referred to as an LOS phosphor.)

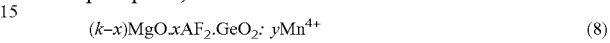

$(k-x)MgO.xAF_2.GeO_2: yMn^{4+}$      (8)

(In the general formula (8), k, x, and y denote numbers respectively satisfying $2.8≤k≤5$, $0.1≤x≤0.7$, and $0.005≤y≤0.015$, and A is any of calcium (Ca), strontium (Sr), barium (Ba), zinc (Zn), and a mixture consisted of these elements) (a germanate phosphor represented by the general formula (8) is referred to as an MGOF phosphor.)

In the first embodiment and the second embodiment of the present invention, a configuration in which only one of a CASN phosphor, a CASON phosphor, and a SCASN phosphor is included in a light-emitting device is preferable for improving the light source efficiency.

On the other hand, a KSF phosphor, a KSNAF phosphor, a KTF phosphor, a KGF phosphor, an LOS phosphor, and an MGOF phosphor have an extremely narrow half-value width of about 6 nm, about 6 nm, about 6 nm, about 6 nm, about 4 nm, and about 16 nm, respectively, and it is preferable to use these phosphors in combination with a CASN phosphor, a CASON phosphor, a SCASN phosphor, or the like because irregularities can be formed in a range suitable for the spectral distribution $\varphi_{SSL}(\lambda)$ of a light-emitting device.

Various means can be considered to reduce $D_{uv}$ from 0 to an appropriate negative value. For example, assuming a light-emitting device having one light-emitting element in each of the three wavelength regions, it is possible to move the light emission position of the light-emitting element in the short-wavelength region further to the short-wavelength side, it is possible to move the light emission position of the light-emitting element in the long-wavelength region further to the long-wavelength side, it is possible to shift the light emission position of the light-emitting element in the intermediate-wavelength region from 555 nm, or the like. Further, it is possible to increase the relative emission intensity of the light-emitting element in the short-wavelength region, it is possible to increase the relative emission intensity of the light-emitting element in the long-wavelength region, it is possible to reduce the relative emission intensity of the light-emitting elements in the intermediate-wavelength region, or the like. Further, in order to change $D_{uv}$ to the positive side, an operation reverse to the above description may be performed.

EXAMPLES

Hereinafter, the present invention will be described more specifically with reference to Examples, and is not limited to the following Examples without departing from the gist thereof. All the Examples were carried out indoors. The following third light-emitting device may be a fourth light-emitting device. In this case, when there are a plurality of third light-emitting devices, all of them may be the fourth light-emitting device, or a part thereof may be the fourth light-emitting device. As described above, an embodiment in the case of using a fourth light-emitting device that mainly illuminates a space around a space where a display item is displayed is shown.

(Light Source)

In the following Examples, light-emitting devices shown in Table 1 were used. As an example, a light source 7 in Table 1 has a $D_{uv}$ of −0.0229 and can be used as a first light-emitting device. A light source 11 has a negative $\Delta C_{14}$ (−2.38), and can be used as a second light-emitting device. Light sources 8 to 10 can be used as a third light-emitting device, and as described above, they can also be used as a fourth light-emitting device.

Example 1-1

First Light-Emitting Device: Light Source 5
Second Light-Emitting Device: Light Source 3

The light source 5 was used as the first light-emitting device, and the light source 3 was used as the second light-emitting device. As shown in FIG. 1, a space was illuminated in such a manner that the light fields of both of the light-emitting devices partially overlapped. The color of light emitted from the first light-emitting device and the color of light emitted from the second light-emitting device were not visually incongruous, and the lights were not seen as separate lights.

TABLE 1

| Light Source | 1 | 2 | 3 | 4 | 5 | 6 | 7 | 8 | 9 | 10 | 11 |
|---|---|---|---|---|---|---|---|---|---|---|---|
| λp | 450 nm | 448 nm | 452 nm | 453 nm | 453 nm | 457 nm | 451 nm | 455 nm | 454 nm | 454 nm | 448 nm |
| CCt | 2983 | 3057 | 3182 | 5228 | 3206 | 5229 | 37.02 | 3042 | 5031 | 3981 | 3045 |
| duv | 0.0007 | −0.0008 | −0.0046 | −0.0046 | −0.0076 | −0.0073 | −0.0229 | 0.0001 | 0.0020 | 0.0009 | −0.0030 |
| Cx | 0.4392 | 0.4318 | 0.4186 | 0.3385 | 0.4136 | 0.3382 | 0.3759 | 0.4341 | 0.3446 | 0.3819 | 0.4295 |
| Cy | 0.4067 | 0.4004 | 0.3861 | 0.3372 | 0.3773 | 0.3320 | 0.03289 | 0.4033 | 0.3552 | 0.3797 | 0.3940 |
| Ra | 82.6 | 92.8 | 95.1 | 95.6 | 86.5 | 88.0 | 65.0 | 82.7 | 84.3 | 84.0 | 93.5 |
| R9 | 10.8 | 70.2 | 82.9 | 79.9 | 39.9 | 27.6 | −47.7 | 5.0 | 12.9 | 10.8 | 73.8 |
| Acg | 110.9 | 141.2 | 71.3 | 78.9 | −13.9 | −12.9 | −295.5 | 84.3 | 126.9 | 124.0 | 122.4 |
| SATave | −1.20 | 0.19 | 1.61 | 1.28 | 3.36 | 2.53 | 6.07 | −1.55 | −1.20 | −1.57 | 0.74 |
| ΔC14/11 | −25.32 | −4.29 | 1.04 | 1.18 | 2.41 | 5.19 | 3.37 | −14.22 | −11.10 | 22.47 | −1.44 |
| ΔC1 | −1.88 | −0.13 | 0.22 | 0.06 | 2.84 | 1.31 | 3.79 | −3.82 | −2.70 | −3.61 | 0.23 |
| ΔC2 | 3.24 | 2.73 | 1.45 | 1.66 | 2.73 | 1.28 | 0.26 | 1.61 | 2.35 | 1.52 | 3.19 |
| ΔC3 | 2.50 | 1.81 | 2.46 | 3.79 | 2.87 | 4.36 | 2.62 | 3.15 | 4.77 | 4.02 | 2.10 |
| ΔC4 | −1.88 | −1.24 | 0.66 | 0.34 | 0.31 | 0.96 | 4.50 | −0.40 | −0.71 | −0.44 | −1.16 |
| ΔC5 | −4.51 | −2.49 | 0.31 | −0.87 | 0.52 | 0.06 | 7.33 | −3.05 | −4.32 | −3.60 | −2.45 |
| ΔC6 | −4.96 | −2.00 | 0.95 | −0.33 | 2.25 | 0.65 | 10.13 | −4.53 | −5.16 | −5.01 | −1.80 |
| ΔC7 | −2.10 | 0.53 | 2.77 | 2.06 | 6.28 | 4.10 | 11.95 | −3.38 | −2.25 | −3.08 | 1.14 |
| ΔC8 | 3.01 | 3.21 | 3.33 | 3.23 | 6.72 | 4.58 | 6.38 | 1.19 | 2.27 | 1.25 | 4.23 |
| ΔC9 | 3.48 | 3.01 | 2.28 | 2.42 | 4.41 | 2.80 | 1.60 | 2.03 | 3.21 | 2.06 | 4.09 |
| ΔC10 | 3.21 | 2.82 | 2.71 | 2.33 | 4.70 | 2.39 | 3.59 | 2.15 | 3.03 | 1.87 | 4.29 |
| ΔC11 | 0.32 | 0.63 | 1.67 | 1.15 | 2.29 | 1.18 | 3.82 | 0.60 | 0.77 | 0.37 | 1.65 |
| ΔC12 | −0.73 | −0.10 | 1.23 | 0.60 | 1.86 | 1.19 | 4.92 | −0.34 | −0.86 | −0.80 | 0.60 |
| ΔC13 | −2.35 | −0.75 | 1.25 | 0.45 | 2.56 | 2.19 | 7.10 | −2.10 | −3.01 | −2.57 | −0.33 |
| ΔC14 | −8.21 | −2.72 | 1.73 | 1.35 | 5.53 | 6.13 | 12.91 | −8.56 | −8.57 | −8.33 | −2.38 |
| ΔC15 | −7.19 | −2.46 | 1.08 | 0.93 | 4.54 | 4.81 | 10.09 | −7.79 | −6.86 | −7.14 | −2.26 |

<1. Appearance of Light Emitted from Light-Emitting Device>

When a space was illuminated using combinations shown in Table 2 of the light-emitting devices described in the "Light source" column, it was examined whether or not the colors of lights emitted from all the light-emitting devices are visually incongruous. Although, in the following Examples, the first light-emitting device does not illuminate a display item, even when a display item is present in the space and the first light-emitting device mainly illuminates the display item, it is easily assumed that the same result as described below is obtained.

TABLE 2

| | First Light-emitting device | Second Light-emitting device | Third Light-emitting device |
|---|---|---|---|
| Example 1-1 | Light Source 5 | Light Source 3 | — |
| Example 1-2 | Light Source 5 | Light Source 3 | Light Source 1 |
| Comparative Example 1-1 | Light Source 5 | — | Light Source 1 |
| Reference Example 1-1 | — | Light Source 3 | Light Source 1 |

Example 1-2

First Light-Emitting Device: Light Source 5
Second Light-Emitting Device: Light Source 3
Third Light-Emitting Device: Light Source 1

Figure 2:
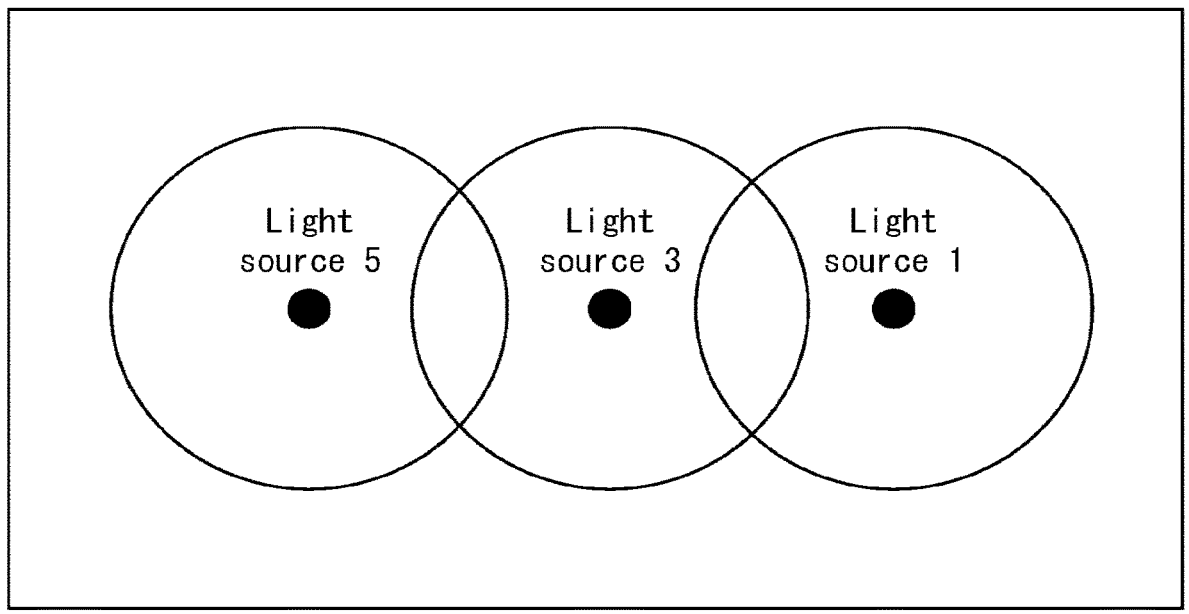
FIG. 2 is a view showing a light field of a light-emitting device in one embodiment of the present invention.

The light source 5 was used as the first light-emitting device, the light source 3 was used as the second light-emitting device, and the light source 1 was used as the third light-emitting device. As shown in FIG. 2, the first light-emitting device, the second light-emitting device, and the third light-emitting device were placed in this order, in such a manner that the light field of the first light-emitting device and the light field of the second light-emitting device partially overlapped, and that the light field of the second light-emitting device and the light field of the third light-emitting device partially overlapped, but the light field of the first light-emitting device and the light field of the third light-emitting device did not overlap.

Lights from the three light-emitting devices were continuous, the color of the light emitted from the first light-emitting device and the color of the light emitted from the second light-emitting device were not visually incongruous, and the lights were not seen as separate lights. The color of the light emitted from the second light-emitting device and the color of the light emitted from the third light-emitting device were not visually incongruous, and the lights were not seen as separate lights.

Comparative Example 1-1

First Light-Emitting Device: Light Source 5
Third Light-Emitting Device: Light Source 1

Figure 3:
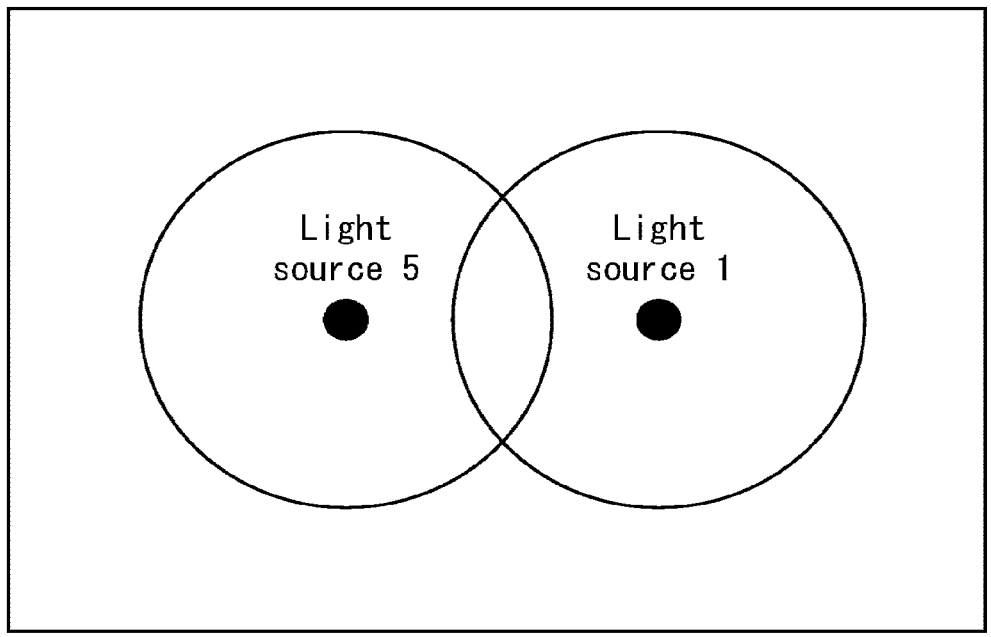
FIG. 3 is a view showing a light field of a light-emitting device in one embodiment of the present invention.

The light source 5 was used as the first light-emitting device, and the light source 1 was used as the third light-emitting device. As shown in FIG. 3, a space was irradiated in such a manner that the light fields of both of the light emitting-devices partially overlapped.

The color of the light emitted from the first light-emitting device appeared pale pinkish with respect to the color of the light emitted from the third light-emitting device, the color of the light emitted from the first light-emitting device and the color of the light emitted from the third light-emitting device were visually incongruous and the lights were recognized as separate lights.

Reference Example 1-1

Second Light-Emitting Device: Light Source 3
Third Light-Emitting Device: Light Source 1

Figure 4:
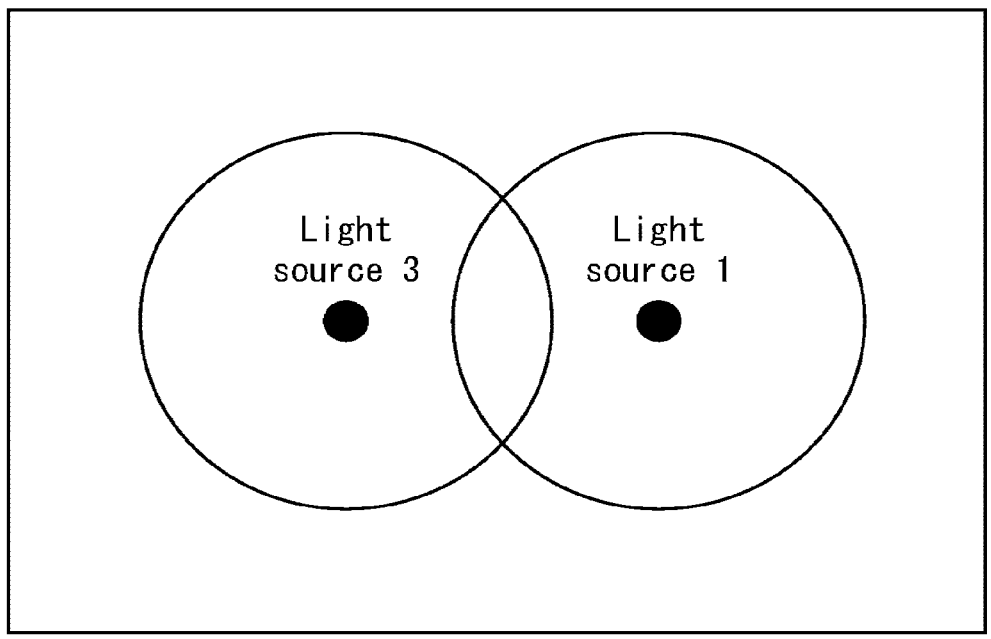
FIG. 4 is a view showing a light field of a light-emitting device in one embodiment of the present invention.

The light source 3 was used as the second light-emitting device, and the light source 1 was used as the third light-emitting device. As shown in FIG. 4, a space was illuminated in such a manner that the light fields of both of the light-emitting devices partially overlapped.

The color of light emitted from the first light-emitting device and the color of light emitted from the third light-emitting device were not visually incongruous, and the lights were not seen as separate lights.

SUMMARY

It has been found that it is preferable that, in order for the colors of lights emitted from a plurality of light-emitting devices to appear without a sense of incongruity, a first light-emitting device and a second light-emitting device may be used, and when using a third light-emitting device in addition to the first light-emitting device and the second light-emitting device, the light field of the second light-emitting device exists between the light field of the first light-emitting device and the light field of the third light-emitting device.

As can be seen from Comparative Example 1-1, although the correlated color temperature of the first light-emitting device (light source 5) and the correlated color temperature of the third light-emitting device (light source 1) were almost the same at about 3,000 K, the color of light emitted from the first light-emitting device and the color of light emitted from the third light-emitting device were visually incongruous, and the lights were recognized as separate lights.

<2. Regarding Perception of Illuminance and Brightness at Specific Position in Space>

Perception of the illuminance and the brightness at a specific position in a space when the space was illuminated using the light-emitting device described in the "Light source" column above were examined. Although, in the following Experimental Examples, the first light-emitting device does not illuminate a display item, even when a display item is present in the space and the first light-emitting device mainly illuminates the display item, it is easily assumed that the same result as described below is obtained.

Reference Experimental Example 2-1

Interior Lighting: Third Light-Emitting Device (Light Source 2, Illuminance: 450 Lux)
Spotlight: Third Light-Emitting Device (Light Source 1, Illuminance: 4,270 Lux)

Figure 5:
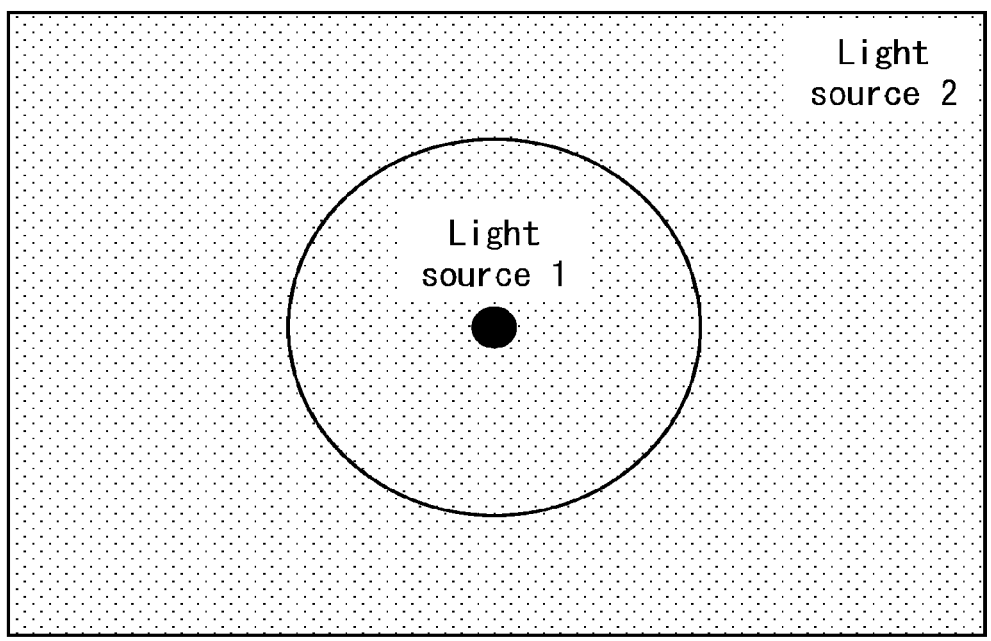
FIG. 5 is a view showing a light field of a light-emitting device in one embodiment of the present invention.

As shown in FIG. 5, an experiment was conducted by placing a third light-emitting device as an interior lighting (light source 2, illuminance: 450 lux) and a third light-emitting device as a spotlight (light source 1, illuminance: 4,270 lux) in such a manner that the light field of the spotlight was within the light field of the interior lighting.

Reference Experimental Example 2-2 to Reference Experimental Example 2-4 were conducted in the same manner as in Reference Experimental Example 2-1 except that combinations shown in Table 3 were used.

[Table 3]

| | Interior lighting | | | Spotlight | | |
|---|---|---|---|---|---|---|
| | Light Emitting device | Light source | Illuminance (lux) | Light Emitting device | Light source | Illuminance (lux) |
| Reference Experimental Example 2-1 | Third | Light Source 2 | 450 | Third | Light Source 1 | 4270 |
| Reference Experimental Example 2-2 | Third | Light Source 2 | 450 | First | Light Source 5 | 4500 |
| Reference Experimental Example 2-3 | Third | Light Source 2 | 450 | Third | Light Source 1 | 7000 |
| Reference Experimental Example 2-4 | Third | Light Source 2 | 450 | First | Light Source 5 | 5500 |

Experimental Example 2-1

Interior Lighting: Second Light-Emitting Device (Light Source 3, Illuminance: 400 Lux)
Spotlight: Third Light-Emitting Device (Light Source 1, Illuminance: 8,600 Lux)

Figure 6:
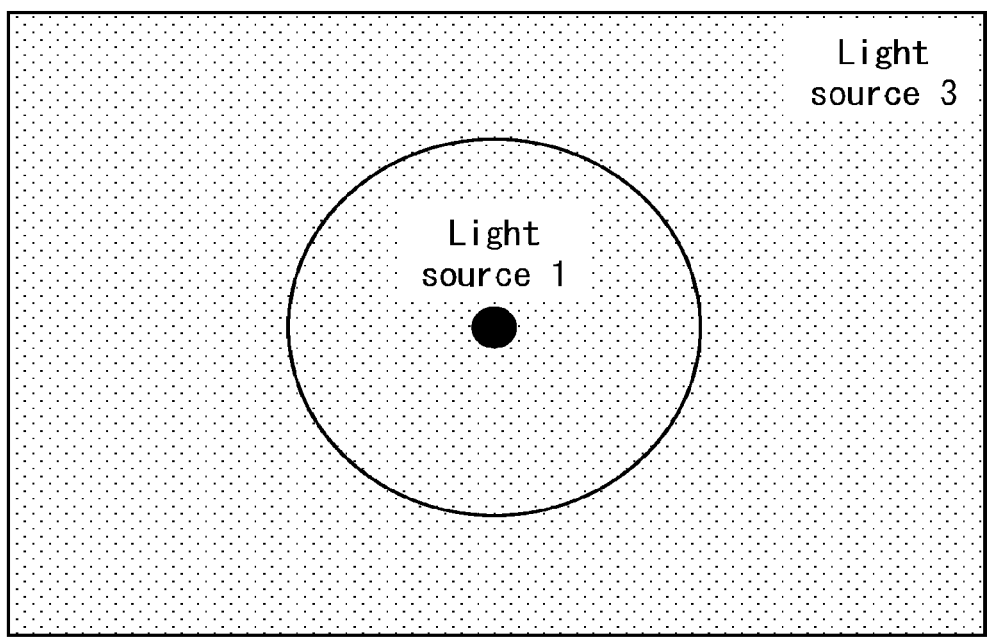
FIG. 6 is a view showing a light field of a light-emitting device in one embodiment of the present invention.

As shown in FIG. 6, an experiment was conducted by placing a second light-emitting device as an interior lighting (light source 3, illuminance: 400 lux) and a third light-emitting device as a spotlight (light source 1, illuminance: 8,600 lux) in such a manner that the light field of the spotlight was within the light field of the interior lighting.

Experimental Example 2-2 to Experimental Example 2-8 were conducted in the same manner as in Experimental Example 2-1 except that combinations of light-emitting devices shown in Table 4 were used.

[Table 4]

| | Interior lighting | | | Spotlight | | |
|---|---|---|---|---|---|---|
| | Light-Emitting device | Light source | Illuminance (lux) | Light-emitting device | Light source | Illuminance (lux) |
| Experimental Example 2-1 | Second | Light Source 3 | 400 | Third | Light Source 1 | 8600 |
| Experimental Example 2-2 | Second | Light Source 3 | 400 | First | Light Source 5 | 6000 |
| Experimental Example 2-3 | Second | Light Source | 450 | Third | Light Source 1 | 10400 |
| Experimental Example 2-4 | Second | Light Source 4 | 450 | First | Light Source 6 | 6600 |
| Experimental Example 2-5 | Second | Light Source 4 | 450 | Third | Light Source 1 | 10800 |
| Experimental Example 2-6 | Second | Light Source 4 | 450 | First | Light Source 6 | 8000 |
| Experimental Example 2-7 | Second | Light Source 4 | 450 | Third | Light Source 1 | 11000 |
| Experimental Example 2-8 | Second | Light Source 4 | 450 | First | Light Source 6 | 7500 |

The following are the results.

Compared with the illuminance of the spotlight used in Reference Experimental Example 2-1, the illuminance of the spotlight used in Reference Experimental Example 2-2 was about 10% higher, and the brightness of the latter was perceived when the difference in brightness between the latter and the former exceeded 230 lux.

Although, compared with the illuminance of the spotlight used in Reference Experimental Example 2-3, the illuminance of the spotlight used in Reference Experimental Example 2-4 was about 20% lower, the brightnesses of both spotlights were perceived as equivalent.

Although, compared with the illuminance of the spotlight used in Experimental Example 2-1, the illuminance of the spotlight used in Experimental Example 2-2 was about 30% lower, the brightnesses of both spotlights were perceived as equivalent.

Although, compared with the illuminance of the spotlight used in Experimental Example 2-3, the illuminance of the spotlight used in Experimental Example 2-4 was about 30% lower, the brightnesses of both spotlights were perceived as equivalent.

Although, compared with the illuminance of the spotlight used in Experimental Example 2-5, the illuminance of the spotlight used in Experimental Example 2-6 was about 20% lower, the brightnesses of both spotlights were perceived as equivalent.

Although, compared with the illuminance of the spotlight used in Experimental Example 2-7, the illuminance of the spotlight used in Experimental Example 2-8 was about 30% lower, the brightnesses of both spotlights were perceived as equivalent.

SUMMARY

The following can be said from Experimental Examples 2-1 to 2-8.

When the first light-emitting device is used as a spotlight, regardless of the correlated color temperature of the second light-emitting device used as an interior lighting, even when the illuminance of the first light-emitting device is lower than the illuminance of the third light-emitting device used as a spotlight, the brightnesses of both of the spotlights are perceived as equivalent.

The following can be said from Reference Experimental Example 2-3 to Reference Experimental Example 2-4.

When the third light-emitting device is used as an interior lighting and the first light-emitting device or the third light-emitting device is used as a spotlight, even when the illuminance of the first light-emitting device is about from 10% to 20% lower than the illuminance of the third light-emitting device, the brightnesses of both of the spotlights are perceived as equivalent.

Considering this with the results of Experimental Example 2-1 to Experimental Example 2-8 in mind, when the second light-emitting device is used as an interior lighting and the first light-emitting device or the third light-emitting device is used as a spotlight, regardless of the correlated color temperature of the second light-emitting device, even when the illuminance of the first light-emitting device is about from 20% to 30% lower than the illuminance of the third light-emitting device used as a spotlight, the brightnesses of both of the spotlights are perceived as equivalent.

In other words, when comparing the case of using the first light-emitting device and the case of using the third light-emitting device as a spotlight, in the case of using the second light-emitting device for an interior lighting than in the case of using the third light-emitting device for an interior lighting, even when the illuminance of the first light-emitting device is lower than that of the illuminance of the third light-emitting device, the brightnesses of spotlights are perceived as equivalent.

3. Others

Experimental Example 3

First Light-Emitting Device: Light Source 5
Second Light-Emitting Device: Light Source 3
Third Light-Emitting Device: Light Source 1

The light source 5 is used as the first light-emitting device, the light source 3 is used as the second light-emitting device, and the light source 1 is used as the third light-emitting device. As in Example 1-2, as shown in FIG. 2, the first light-emitting device, the second light-emitting device, and the third light-emitting device are placed in this order, in such a manner that the light field of the first light-emitting device and the light field of the second light-emitting device partially overlap, and that the light field of the second light-emitting device and the light field of the third light-emitting device partially overlap, but the light field of the first light-emitting device and the light field of the third light-emitting device do not overlap.

In this case, it is clear from Table 1 that at least one of $D_{uvSSL2}$, $SAT_{ave2}$, and Mired-2($K^{-1}$) of the second light-emitting device satisfies the following condition.

In other words, with respect to $D_{uvSSL2}$, $$D_{uvSSL1} < D_{uvSSL2} < D_{uvSSL3}$$

is satisfied, and $$D_{uvSSL2} = D_{uvSSL1} + (D_{uvSSL3} - D_{uvSSL1}) \times \{(1/2) \pm x\}$$

is satisfied, where x is 0.35 or less.

With respect to $SAT_{ave2}$, $$SAT_{ave3} < SAT_{ave2} < SAT_{ave1}$$

is satisfied, and $$SAT_{ave2} = SAT_{ave1} + (SAT_{ave3} - SAT_{ave1}) \times \{(1/2) \pm x\}$$

is satisfied, where x is 0.35 or less.

$$\text{Mired-2}(K^{-1}) = \text{Mired-}L(K^{-1}) + (\text{Mired-}H(K^{-1}) - \text{Mired-}L(K^{-1})) \times \{(1/2) \pm x\}$$

is satisfied, where x is 0.35 or less.

In this case, lights from the three light-emitting devices are continuous, the color of the light emitted from the first light-emitting device and the color of the light emitted from the second light-emitting device are not visually incongruous, and the lights are not seen as separate lights. The color of light emitted from the second light-emitting device and the color of light emitted from the third light-emitting device are not visually incongruous, and the lights are not seen as separate lights. In other words, adjacent lights emitted from the three light-emitting devices form gradation without a sense of incongruity as a whole.

The same also applies to the case where the fourth light-emitting device is used in place of the third light-emitting device. In other words, lights from the three light-emitting devices are continuous, the color of the light emitted from the first light-emitting device and the color of the light emitted from the second light-emitting device are not visually incongruous, and the lights are not seen as separate lights. The color of light emitted from the second light-emitting device and the color of light emitted from the fourth light-emitting device are not visually incongruous, and the lights are not seen as separate lights. In other words, adjacent lights emitted from the three light-emitting devices form gradation without a sense of incongruity as a whole.

The same also applies to the case where the fourth light-emitting device is used in addition to the third light-emitting device. In other words, lights from the four light-emitting devices are continuous, the color of the light emitted from the first light-emitting device and the color of the light emitted from the second light-emitting device are not visually incongruous, and the lights are not seen as separate lights. The color of the light emitted from the second light-emitting device and the color of the light emitted from the third light-emitting device are not visually incongruous, and the lights are not seen as separate lights. Further, the color of light emitted from the third light-emitting device and the color of light emitted from the fourth light-emitting device are not visually incongruous, and the lights are not seen as separate lights. In other words, adjacent lights emitted from the four light-emitting devices form gradation without a sense of incongruity as a whole.

The same applies to cases in which the light source 7 is used as the first light-emitting device. The same applies to cases in which the light source 11 is used as the second light-emitting device. The same applies to cases in which one or more of the light sources 8 to 10 are used as the second light-emitting device.

The invention claimed is:

1. An illumination method of illuminating a space where a display item is displayed, the illumination method comprising
   a first illuminating step mainly illuminating the display item with a first light-emitting device, and
   a second illuminating-step mainly illuminating a space other than the display item with a second light-emitting device, wherein
   (I') light measured at the position of a display item when light emitted from the first light-emitting device mainly lights the display item in the first illuminating step lights in such a manner to satisfy the following conditions:
   (I'-1) $D_{uv}$ is from −0.0120 to −0.0050;
   (I'-2) if an a* value and a b* value in CIE 1976 L*a*b* color space of 15 Munsell renotation color samples from #01 to #15 listed below when mathematically assuming illumination by the light measured at the position of the display item are respectively denoted by $a^*_{nSSL}$ and $b^*_{nSSL}$ (where n is a natural number from 1 to 15), and
   if an a* value and a b* value in CIE 1976 L*a*b* color space of the 15 Munsell renotation color samples when mathematically assuming illumination by a reference light that is selected according to a correlated color temperature $T_{SSL}(K)$ of the light measured at the position of the display item are respectively denoted by $a^*_{nref}$ and $b^*_{nref}$ (where n is a natural number from 1 to 15), then,
   each saturation difference $\Delta C_n$ (n is a natural number from 1 to 15) is from −3.8 to 18.6,
   where $\Delta C_n$ (n is a natural number from 1 to 15)=$\sqrt{(a^*_{nSSL})^2+(b^*_{nSSL})^2}-\sqrt{(a^*_{nref})^2+(b^*_{nref})^2}$;
   with the 15 Munsell renotation color samples being:

| #01 | 7.5P | 4/10 |
| #02 | 10PB | 4/10 |
| #03 | 5PB | 4/12 |
| #04 | 7.5B | 5/10 |
| #05 | 10BG | 6/8 |
| #06 | 2.5BG | 6/10 |
| #07 | 2.5G | 6/12 |
| #08 | 7.5GY | 7/10 |
| #09 | 2.5GY | 8/10 |
| #10 | 5Y | 8.5/12 |
| #11 | 10YR | 7/12 |
| #12 | 5YR | 7/12 |
| #13 | 10R | 6/12 |
| #14 | 5R | 4/14 |
| #15 | 7.5RP | 4/12 |

(I'-3) the average of the $\Delta C_n$ (n is every integer from 1 to 15) is from 0.5 to 7.0;
   (I'-4) the saturation difference $\Delta C_{14}$ of the illuminating step satisfies $$0 \le \Delta C_{14},$$

where $\Delta C_{14}$ represents the $\Delta C_n$ when n=14;
   (II') light measured in a space other than the display item when light emitted from the second light-emitting device mainly lights the space other than the display item mainly illuminated by the first light-emitting device in the second illuminating step lights in such a manner to satisfy the following conditions:
   (I'-1) $D_{uv}$ is from −0.0070 to less than 0;
   (II'-2) in the light measured in a space other than the display item, the saturation difference $\Delta C_n$ (n is a natural number from 1 to 15) defined in the same manner as in the case of the first illuminating step is from −3.8 to 18.6;
   (II'-3) the average of the $\Delta C_n$ (n is every integer from 1 to 15) is from 0.5 to 7.0; and
   (II'-4) the saturation difference $\Delta C_{14}$ of the illuminating step satisfies $$0 \le \Delta C_{14},$$

where $\Delta C_{14}$ represents the $\Delta C_n$ when n=14; and
   (III') if the average of $\Delta C_n$ (i is every integer from 1 to 15) of the first illuminating step is $SAT_{ave1}$, and
   if the average of $\Delta C_n$ (n is every integer from 1 to 15) of the second illuminating step is $SAT_{ave2}$, $$SAT_{ave2} < SAT_{ave1}$$

is satisfied.

2. The illumination method according to claim 1, wherein
   (IV') if $D_{uv}$ of the first illuminating step is $D_{uvSSL1}$, and if $D_{uv}$ of the second illuminating is $D_{uvSSL2}$, $$D_{uvSSL1} < D_{uvSSL2}$$

is satisfied.

3. The illumination method according to claim 2, wherein (VII') $D_{uvSSL2}/D_{uvSSL1}$ which is the ratio of the $D_{uvSSL2}$ to the $D_{uvSSL1}$ is from 0.25 to 0.75.

4. The illumination method according to claim 1, wherein (V') |$D_{uvSSL2}-D_{uvSSL1}$| which is a difference between the $D_{uvSSL1}$ and the $D_{uvSSL2}$ is more than 0 to 0.0070.

5. The illumination method according to claim 1, wherein (I'-5) (II'-5) in the light measured at the position of the display item in the first illuminating step, and the light measured in a space other than the display item mainly illuminated by the first light-emitting device in the second illuminating step,
   if a spectral power distribution is denoted by $\varphi_{SSL}(\lambda)$, a spectral power distribution of a reference light that is selected according to $T_{SSL}(K)$ is denoted by $\varphi_{ref}(\lambda)$, tristimulus values are denoted by $(X_{SSL}, Y_{SSL}, Z_{SSL})$, and tristimulus values of the reference light that is selected according to $T_{SSL}(K)$ are denoted by $(X_{ref}, Y_{ref}, Z_{ref})$, and if a normalized spectral power distribution $S_{SSL}(\lambda)$, a normalized spectral power distribution $S_{ref}(\lambda)$ of a reference light that is selected according to $T_{SSL}(K)$, and a difference $\Delta S_{SSL}(\lambda)$ between these normalized spectral power distributions are respectively defined as $S_{SSL}(\lambda)=\varphi_{SSL}(\lambda)/Y_{SSL}$, $S_{ref}(\lambda)=\varphi_{ref}(\lambda)/Y_{ref}$ and $\Delta S_{SSL}(\lambda)=S_{ref}(\lambda)-S_{SSL}(\lambda)$ and in the case when a wavelength that produces a longest wavelength local maximum value of $S_{SSL}(\lambda)$ in a wavelength range from 380 nm to 780 nm is denoted by $\lambda_R$ (nm), and a wavelength $\lambda 4$ that assumes $S_{SSL}(\lambda_R)/2$ exists on a longer wavelength-side of $\lambda_R$, an index $A_{cg}$ represented by the following Expression (1) is from −30 to 120, and on the other hand, in the case when a wavelength that produces a longest wavelength local maximum value of the $S_{SSL}(\lambda)$ in a wavelength range from 380 nm to 780 nm is denoted by $\lambda_R$ (nm), and a wavelength $\lambda 4$ that assumes $S_{SSL}(\lambda_R)/2$ does not exist on a longer wavelength-side of the $\lambda_R$, an index $A_{cg}$ represented by the following Expression (2) is from −30 to 120;

[Expression 3]

$$A_{cg} = \int_{380}^{495} \Delta S(\lambda)d\lambda + \int_{495}^{590} (-\Delta S(\lambda))d\lambda + \int_{590}^{\lambda 4} \Delta S(\lambda)d\lambda \quad (1)$$

[Expression 4]

$$A_{cg} = \int_{380}^{495} \Delta S(\lambda)d\lambda + \int_{495}^{590} (-\Delta S(\lambda))d\lambda + \int_{590}^{780} \Delta S(\lambda)d\lambda \quad (2)$$

(VI') if the index $A_{cg}$ of the first illuminating step is $A_{cg}(\varphi_{SSL1}(\lambda))$, and if the index $A_{cg}$ of the second illuminating step is $A_{cg}(\varphi_{SSL2}(\lambda))$, $A_{cg}(\varphi_{SSL1}(\lambda))<A_{cg}(\varphi_{SSL2}(\lambda))$ is satisfied.

6. The illumination method according to claim 1, wherein a space where the display item is displayed is a closed space provided with at least one entrance,
the illumination method further comprises:
third illuminating step in which a third light-emitting device mainly illuminates one or more of the entrances, wherein
the third light-emitting device does not satisfy at least one of the conditions that the first light-emitting device satisfies, and does not satisfy at least one of the conditions that the second light-emitting device satisfies.

7. An illumination method of illuminating a space where a display item is displayed, the illumination method comprising:
a first illuminating step mainly illuminating the display item with a first light-emitting device,
a second illuminating step mainly illuminating a space other than the display item with a second light-emitting device, and a fourth illuminating step mainly illuminating a space around the space where the display item is displayed with a fourth light-emitting device wherein (I') light measured at the position of a display item when light emitted from the first light-emitting device mainly lights the display item in the first illuminating step lights in such a manner to satisfy the following conditions:

(I'-1) $D_{uv}$ is from −0.0120 to −0.0050;

(I'-2) if an a* value and a b* value in CIE 1976 L*a*b* color space of 15 Munsell renotation color samples from #01 to #15 listed below when mathematically assuming illumination by the light measured at the position of the display item are respectively denoted by $a^*_{nSSL}$ and $b^*_{nSSL}$ (where n is a natural number from 1 to 15), and if an a* value and a b* value in CIE 1976 L*a*b* color space of the 15 Munsell renotation color samples when mathematically assuming illumination by a reference light that is selected according to a correlated color temperature $T_{SSL}(K)$ of the light measured at the position of the display item are respectively denoted by $a^*_{nref}$ and $b^*_{nref}$ (where n is a natural number from 1 to 15), then, each saturation difference $\Delta C_n$ (n is a natural number from 1 to 15) is from −3.8 to 18.6, where $\Delta C_n$ (n is a natural number from 1 to 15)=$\sqrt{\{(a^*_{nSSL})^2+(b^*_{nSSL})^2\}}-\sqrt{\{(a^*_{nref})^2+(b^*_{nref})^2\}}$;

with the 15 Munsell renotation color samples being:

| #01 | 7.5P | 4/10 |
| #02 | 10PB | 4/10 |
| #03 | 5PB | 4/12 |
| #04 | 7.5B | 5/10 |
| #05 | 10BG | 6/8 |
| #06 | 2.5BG | 6/10 |
| #07 | 2.5G | 6/12 |
| #08 | 7.5GY | 7/10 |
| #09 | 2.5GY | 8/10 |
| #10 | 5Y | 8.5/12 |
| #11 | 10YR | 7/12 |
| #12 | 5YR | 7/12 |
| #13 | 10R | 6/12 |
| #14 | 5R | 4/14 |
| #15 | 7.5RP | 4/12 |

(I'-3) the average of the $\Delta C_n$ (n is every integer from 1 to 15) is from 0.5 to 7.0;

(II') light measured in a space other than the display item when light emitted from the second light-emitting device mainly lights the space other than the display item mainly illuminated by the first light-emitting device in the second illuminating step lights in such a manner to satisfy the following conditions:

(II'-1) $D_{uv}$ is from −0.0070 to less than 0;

(II'-2) in the light measured in a space other than the display item, the saturation difference $\Delta C_n$ (n is a natural number from 1 to 15) defined in the same manner as in the case of the first illuminating step is from −3.8 to 18.6; and (II'-3) the average of the $\Delta C_n$ (n is every integer from 1 to 15) is from 0.5 to 7.0;

(III') if the average of $\Delta C_n$ (n is every integer from 1 to 15) of the first illuminating step is $SAT_{ave1}$, and if the average of $\Delta C_n$ (n is every integer from 1 to 15) of the second illuminating step is $SAT_{ave2}$, $SAT_{ave2}<SAT_{ave1}$ is satisfied; and light measured at the position of a display item when light emitted from the first light-emitting device mainly lights the display item in the first illuminating step, light measured in a space other than the display item when light emitted from the second light-emitting device mainly lights the space other than the display item mainly illuminated by the first light-emitting device in the second illuminating step, and light measured in a space around the space where the display item is displayed when light emitted from the fourth light-emitting device mainly lights the space therearound in the fourth illuminating step satisfy at least one of the following conditions (IX'-1) to (IX'-4);

(IX'-1)

if $D_{uv}$ of the first illuminating step is $D_{uvSSL1}$, if Duv of the second illuminating step is $D_{uvSSL2}$, and if $D_{uv}$ of the fourth illuminating step is $D_{uvSSL4}$, $$D_{uvSSL1} < D_{uvSSL2} < D_{uvSSL4}$$

is satisfied;

$$D_{uvSSL2} = D_{uvSSL1} + (D_{uvSSL4} - D_{uvSSL1}) \times \{(1/2) \pm x\} \quad \text{(IX'-2)}$$

is satisfied, where x is 0.35 or less;

(IX'-3)

if the average of $\Delta C_n$ (n is every integer from 1 to 15) of the fourth illuminating step which is defined in the same manner as in the case of the first illuminating step is $SAT_{ave4}$, $$SAT_{ave4} < SAT_{ave2} < SAT_{ave1}$$

is satisfied, $$SAT_{ave2} = SAT_{ave1} + (SAT_{ave4} - SAT_{ave1}) \times \{(1/2) \pm x\} \quad \text{(IX'-4)}$$

is satisfied, where x is 0.35 or less.

8. The illumination method according to claim 7, wherein (I'-4) the saturation difference $\Delta C_{14}$ of the first illuminating step satisfies $$0 \le \Delta C_{14},$$

where $\Delta C_{14}$ represents the $\Delta C_n$ when n=14.

9. The illumination method according to claim 7, wherein (II'-4) the saturation difference $\Delta C_{14}$ of the second illuminating step satisfies $$0 \le \Delta C_{14},$$

where $\Delta C_{14}$ represents the $\Delta C_n$ when n=14.

10. The illumination method according to claim 7, wherein light measured at the position of a display item when light emitted from the first light-emitting device mainly lights the display item in the first illuminating step, light measured in a space other than the display item when light emitted from the second light-emitting device mainly lights the space other than the display item mainly illuminated by the first light-emitting device in the second illuminating step, and light measured in a space around the space where the display item is displayed when light emitted from the fourth light-emitting device mainly lights the space therearound in the fourth illuminating step satisfy both the condition (IX'-1) and the condition (X'-2).

11. The illumination method according to claim 7, wherein light measured at the position of a display item when light emitted from the first light-emitting device mainly lights the display item in the first illuminating step, light measured in a space other than the display item when light emitted from the second light-emitting device mainly lights the space other than the display item mainly illuminated by the first light-emitting device in the second illuminating step, and light measured in a space around the space where the display item is displayed when light emitted from the fourth light-emitting device mainly lights the space therearound in the fourth illuminating step satisfy both the condition (IX'-3) and the condition (IX'-4).

12. The illumination method according to claim 7, wherein light measured at the position of a display item when light emitted from the first light-emitting device mainly lights the display item in the first illuminating step, light measured in a space other than the display item when light emitted from the second light-emitting device mainly lights the space other than the display item mainly illuminated by the first light-emitting device in the second illuminating step, and light measured in a space around the space where the display item is displayed when light emitted from the fourth light-emitting device mainly lights the space therearound in the fourth illuminating step satisfy all the conditions (IX-1) to (IX'-4).

13. The illumination method according to claim 7, wherein light measured at the position of a display item when light emitted from the first light-emitting device mainly lights the display item in the first illuminating step, light measured in a space other than the display item when light emitted from the second light-emitting device mainly lights the space other than the display item mainly illuminated by the first light-emitting device in the second illuminating step, and light measured in a space around the space where the display item is displayed when light emitted from the fourth light-emitting device mainly lights the space therearound in the fourth illuminating step satisfy the following condition (IX'-5):

(IX'-5)

if the correlated color temperature of, light measured at the position of a display item when light emitted from the first light-emitting device mainly lights the display item in the first illuminating step is $T_{SSL1}(K)$, if the correlated color temperature of, light measured in a space other than the display item when light emitted from the second light-emitting device mainly lights the space other than the display item mainly illuminated by the first light-emitting device in the second illuminating step is $T_{SSL2}(K)$, if the correlated color temperature of, light measured in a space around the space where the display item is displayed when light emitted from the fourth light-emitting device mainly lights the space therearound in the fourth illuminating step is $T_{SSL4}(K)$, if, comparing the $T_{SSL1}(K)$ with the $T_{SSL4}(K)$, the larger one is $T_{SSL-H}(K)$, and the smaller one is $T_{SSL-L}(K)$, and if one million times the reciprocal of the $T_{SSL-H}(K)$ is Mired-H($K^{-1}$), if one million times the reciprocal of the $T_{SSL-L}(K)$ is Mired-L($K^{-1}$), and if one million times the reciprocal of the $T_{SSL}(K)$ is Mired-2($K^{-1}$), Mired-2($K^{-1}$)=Mired-$L$($K^{-1}$)+(Mired-$H$($K^{-1}$)-Mired-$L$($K^{-1}$))×{(½)±$x$}, where x is 0.35 or less.

14. An illumination system for illuminating a space where a display item is displayed, the illumination system comprising:
   a first light-emitting device mainly illuminating the display item, and
   a second light-emitting device mainly illuminating a space other than the display item, wherein
   (I) the first light-emitting device is a light-emitting device comprising a light-emitting element therein,
   (I-1) light emitted from the light-emitting device comprises light whose $D_{uv}$ is from −0.0120 to −0.0050 in the main radiant direction;
   (I-2) if an a* value and a b* value in CIE 1976 L*a*b* color space of 15 Munsell renotation color samples from #01 to #15 listed below when mathematically assuming illumination by the light emitted in the radiant direction are respectively denoted by a*$_{nSSL}$ and b*$_{nSSL}$ (where n is a natural number from 1 to 15), and
   if an a* value and a b* value in CIE 1976 L*a*b* color space of the 15 Munsell renotation color samples when mathematically assuming illumination by a reference light that is selected according to a correlated color temperature $T_{SSL}$(K) of the light emitted in the radiant direction are respectively denoted by a*$_{nref}$ and b*$_{nref}$ (where n is a natural number from 1 to 15), then,
   in light emitted from the light-emitting device in the radiant direction,
   each saturation difference $\Delta C_n$ (n is a natural number from 1 to 15) is from −3.8 to 18.6,
   where $\Delta C_n$ (n is a natural number from 1 to 15)=$\sqrt{\{(a^*_{nSSL})^2+(b^*_{nSSL})^2\}}-\sqrt{\{(a^*_{nref})^2+(b^*_{nref})^2\}}$;
   with the 15 Munsell renotation color samples being:

| | | |
|---|---|---|
| #01 | 7.5P | 4/10 |
| #02 | 10PB | 4/10 |
| #03 | 5PB | 4/12 |
| #04 | 7.5B | 5/10 |
| #05 | 10BG | 6/8 |
| #06 | 2.5BG | 6/10 |
| #07 | 2.5G | 6/12 |
| #08 | 7.5GY | 7/10 |
| #09 | 2.5GY | 8/10 |
| #10 | 5Y | 8.5/12 |
| #11 | 10YR | 7/12 |
| #12 | 5YR | 7/12 |
| #13 | 10R | 6/12 |
| #14 | 5R | 4/14 |
| #15 | 7.5RP | 4/12 |

(I-3) the average of the $\Delta C_n$ (n is every integer from 1 to 15) is from 0.5 to 7.0;
   (I-4) the saturation difference $\Delta C_{14}$ of the light-emitting device satisfies $0 \leq \Delta C_{14}$, where $\Delta C_{14}$ represents the $\Delta C_n$ when i=14;
   (II) the second light-emitting device is a light-emitting device comprising a light-emitting element therein,
   (II-1) light emitted from the light-emitting device comprises light whose $D_{uv}$ is from −0.0070 to less than 0 in the main radiant direction;
   (II-2) in light emitted from the light-emitting device in the radiant direction, $\Delta C_n$ (n is a natural number from 1 to 15) defined in the same manner as in the case of the first light-emitting device is from −3.8 to 18.6;
   (II-3) the average of the $\Delta C_n$ (n is every integer from 1 to 15) is from 0.5 to 7.0; and
   (II-4) the saturation difference $\Delta C_{14}$ of the light-emitting device satisfies $0 \leq \Delta C_{14}$, where $\Delta C_{14}$ represents the $\Delta C_n$ when n=14; and
   (III) if the average of $\Delta C_n$ (i is every integer from 1 to 15) of the first light-emitting device is $SAT_{ave1}$, and
   if the average of $\Delta C_n$ (n is every integer from 1 to 15) of the second light-emitting device is $SAT_{ave2}$, $SAT_{ave2} < SAT_{ave1}$ is satisfied.

15. The illumination system according to claim 14, wherein
   (IV) if $D_{uv}$ of the first light-emitting device is $D_{uvSSL1}$, and if $D_{uv}$ of the second light-emitting device is $D_{uvSSL2}$, $D_{uvSSL1} < D_{uvSSL2}$ is satisfied.

16. The illumination system according to claim 14, wherein
   (V) |$D_{uvSSL2}-D_{uvSSL1}$| which is a difference between the $D_{uvSSL1}$ and the $D_{uvSSL2}$ is more than 0 to 0.0070.

* * * * *

UNITED STATES PATENT AND TRADEMARK OFFICE
CERTIFICATE OF CORRECTION

PATENT NO. : 10,959,312 B2
APPLICATION NO. : 16/606476
DATED : March 23, 2021
INVENTOR(S) : Koichi Fukasawa et al.

Page 1 of 1

It is certified that error appears in the above-identified patent and that said Letters Patent is hereby corrected as shown below:

In the Claims

Column 43, Line 61, in Claim 1, "$b^*_{ref}$", should read -- "$b^*_{nref}$" --

Column 45, Line 19, in Claim 5, "λ4" should read -- Λ4 --

Column 46, Line 26, in Claim 7, "λ4" should read -- Λ4 --

Column 50, Line 14, in Claim 14, "i=14" should read -- n=14 --

Signed and Sealed this
Tenth Day of August, 2021

Drew Hirshfeld
*Performing the Functions and Duties of the
Under Secretary of Commerce for Intellectual Property and
Director of the United States Patent and Trademark Office*